United States Patent
Ohta et al.

(10) Patent No.: US 7,209,472 B2
(45) Date of Patent: Apr. 24, 2007

(54) METHOD OF CONTROLLING CHANGE-OVER OF CONNECTION ROUTE BETWEEN MEDIA GATEWAY APPARATUSES, AND CALL AGENT APPARATUS

(75) Inventors: Masami Ohta, Fukuoka (JP); Seiji Tokunaga, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 826 days.

(21) Appl. No.: 09/969,950

(22) Filed: Oct. 3, 2001

(65) Prior Publication Data

US 2002/0172209 A1    Nov. 21, 2002

(30) Foreign Application Priority Data

May 18, 2001    (JP)    ............................. 2001-149806

(51) Int. Cl.
*H04L 12/28*    (2006.01)
(52) U.S. Cl. .................................... 370/351; 370/401
(58) Field of Classification Search ........ 370/216–230, 370/237, 348, 351–358, 310, 328, 338, 400, 370/401–402, 332, 377, 384, 386, 389, 426, 370/493–496, 235–238, 242, 248, 252, 253, 370/229; 709/105, 239
See application file for complete search history.

(56) References Cited

U.S. PATENT DOCUMENTS 6,064,653 A * 5/2000 Farris .......................... 370/237

6,404,864 B1 * 6/2002 Evslin et al. .......... 379/112.01
6,600,735 B1 * 7/2003 Iwama et al. ................ 370/352

FOREIGN PATENT DOCUMENTS

| JP | 01049456 | 2/1989 |
|---|---|---|
| JP | 2000174825 | 6/2000 |
| JP | 2000209282 | 7/2000 |
| JP | 2000307649 | 11/2000 |

\* cited by examiner

*Primary Examiner*—Brenda Pham
(74) *Attorney, Agent, or Firm*—Katten Muchin Rosenman LLP

(57) ABSTRACT

The invention relates to a method of controlling change-over of a connection route between media gateway apparatuses, and a call agent apparatus. During communications, a connection route of deteriorated quality is changed over to a connection route of high quality selected from a plurality of IP networks. Thus, the transmission quality is maintained, and high-quality transmission services are provided at low cost.

In a voice/data integrated network having subscribers lines accommodated in STM channel switches LS1 and LS2 connected to an IP network via media gateway apparatuses MG1 and MG2 respectively, the media gateway apparatuses MG1 and MG2 collect/edit real-time packet quality information of IP packets for each call, and post the quality information to a call agent CA. The call agent CA updates packet quality information for each connection route based on the packet quality information, and transmits an instruction, for changing over a connection route of a call at a deteriorated quality level to a connection route of good quality, to the media gateway apparatuses MG1 and MG2.

9 Claims, 21 Drawing Sheets

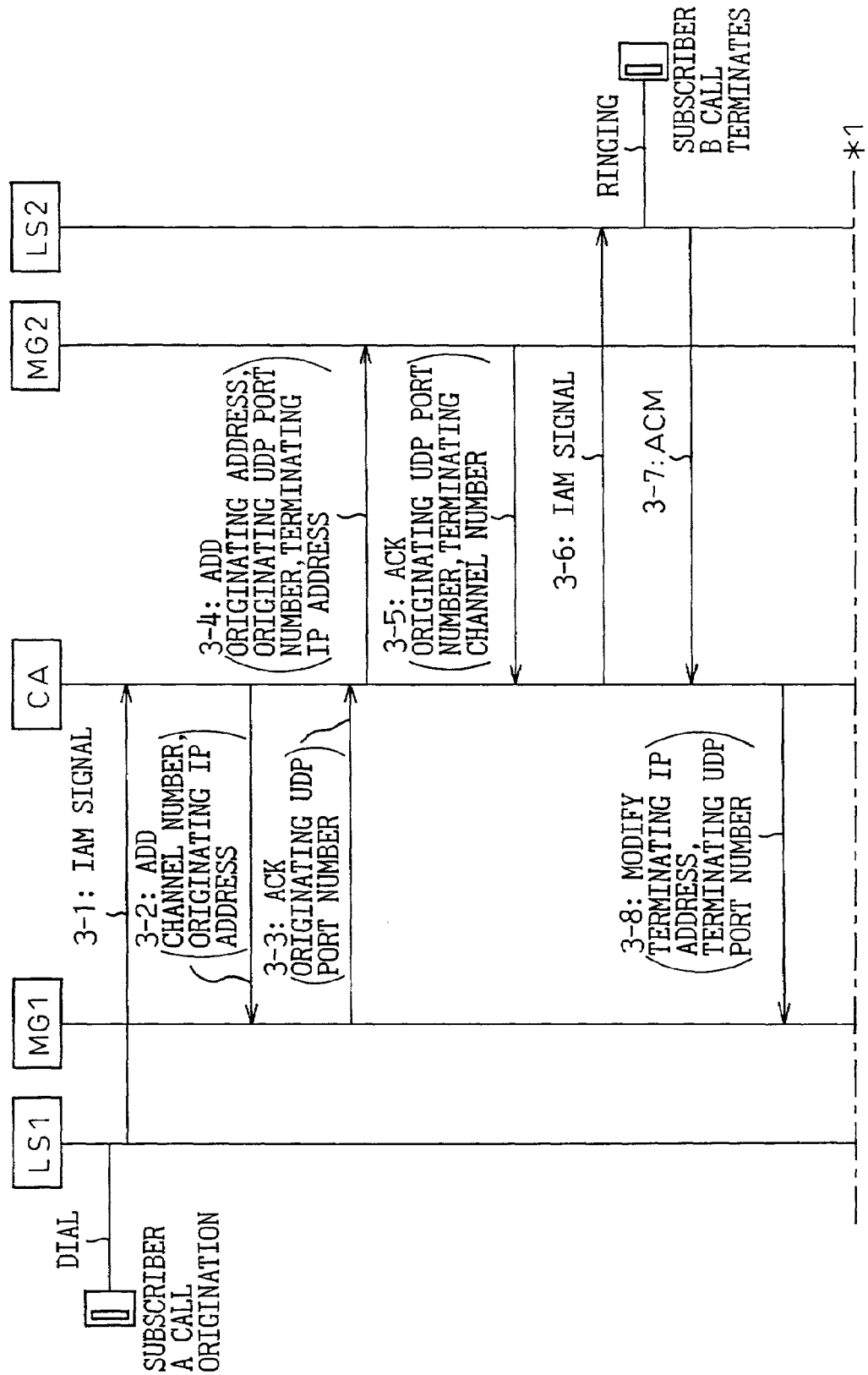

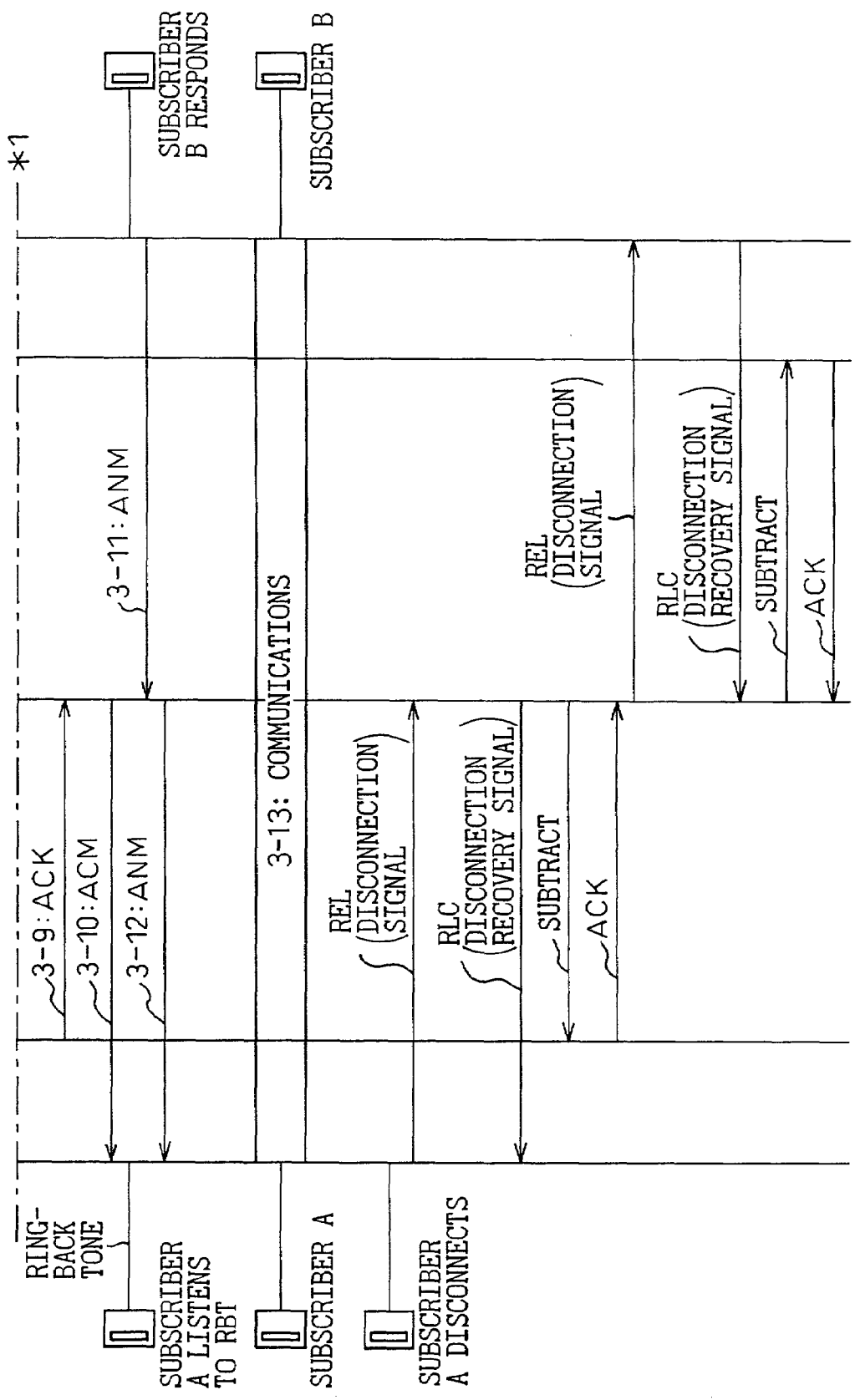

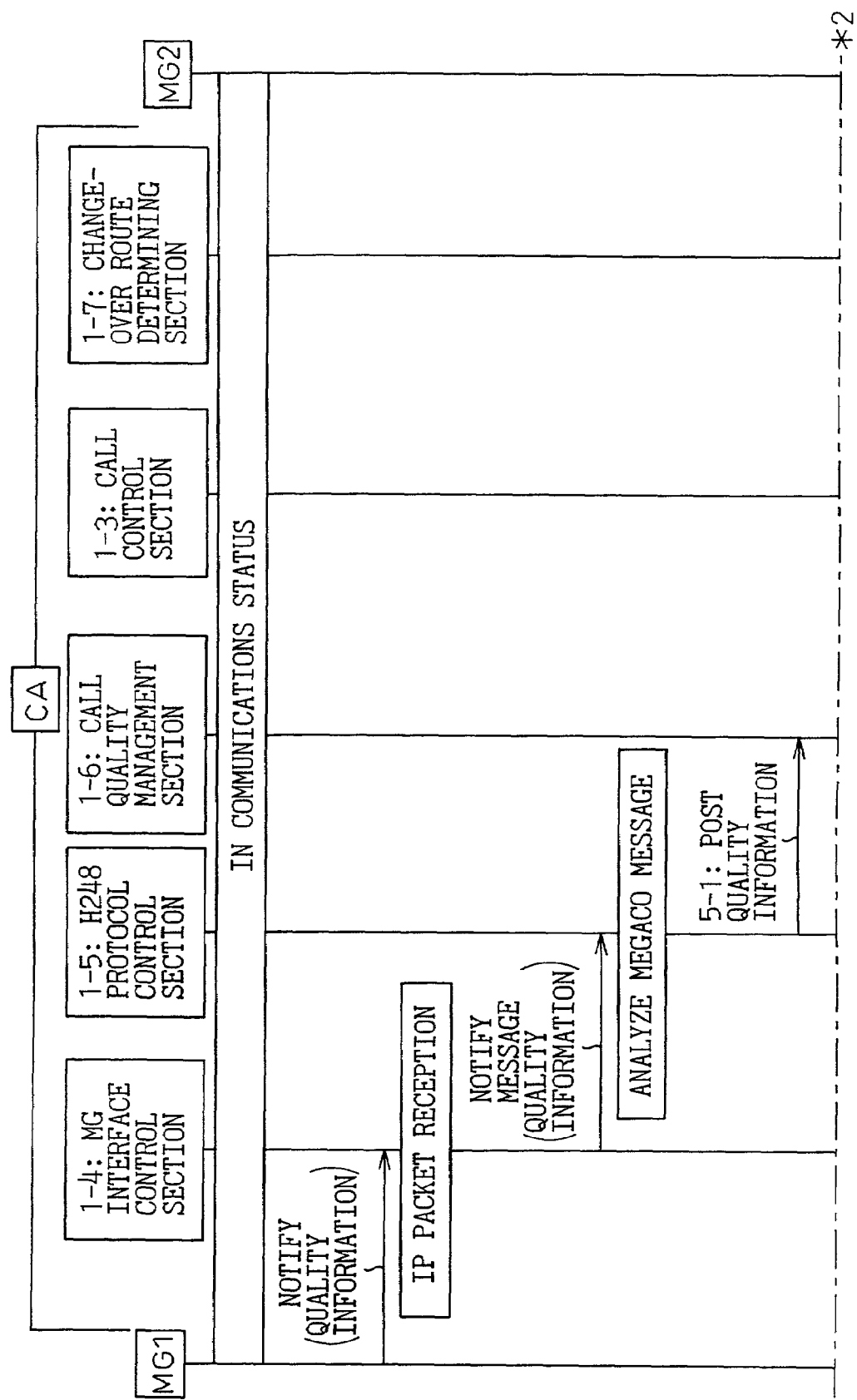

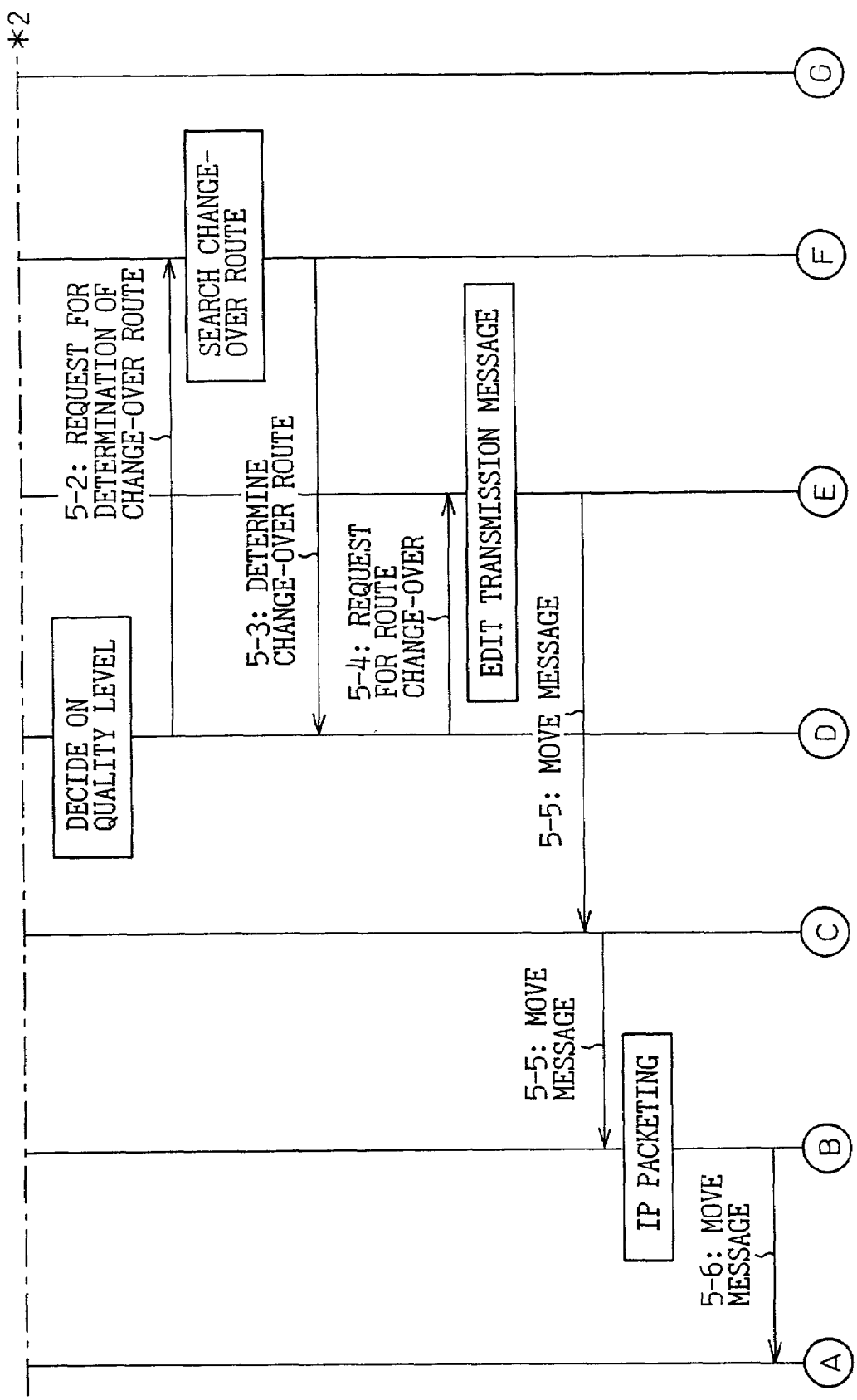

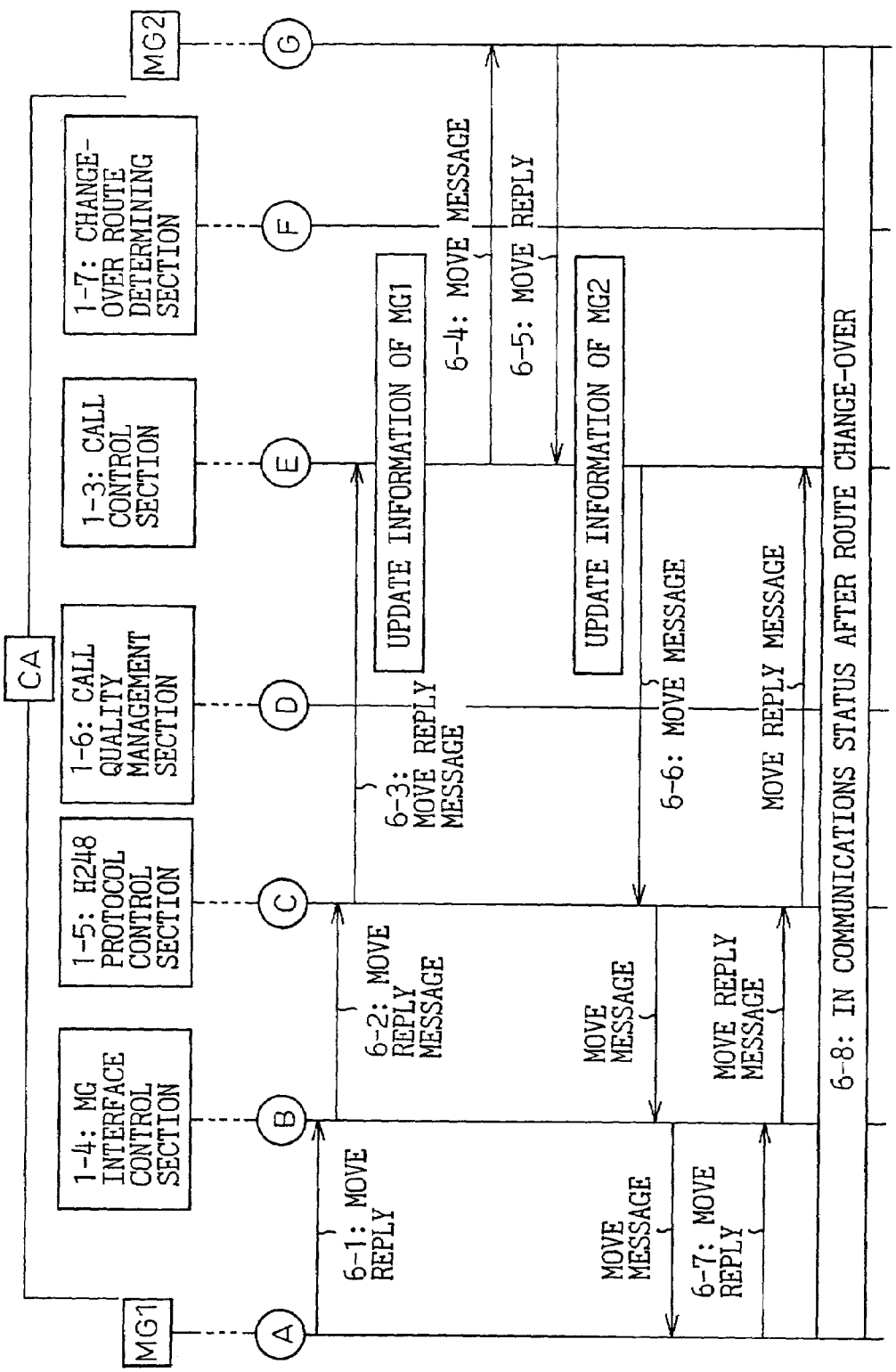

Fig.7

| 0 | | | 16 | 31 |
|---|---|---|---|---|
| V | P | RC | PT | LENGTH |
| (SSRC OF SENDER) ||||
| NTP TIME STAMP (HIGH LEVEL) ||||
| NTP TIME STAMP (LOW LEVEL) ||||
| RTP TIME STAMP ||||
| SENDER PACKET COUNT ||||
| SENDER OCTET COUNT ||||
| SSRC_1 (SSRC OF FIRST SEND ORIGIN) ||||
| ·PACKET DROP RATE | | ·CUMULATIVE NUMBER OF DROPPED PACKETS |||
| RECEIVED MAXIMUM SEQUENCE NUMBER ||||
| ·JITTER INTERVAL ||||
| LAST SR ||||
| DELAY SINCE LAST SR ||||

```
VERSION(V) : SHOWS VERSION OF RTP
P          : PADDING
RC         : NUMBER OF RECEIVED REPORT BLOCKS
PT         : PACKET TYPE
             RTCP(SR) PACKET: 200
             RTCP(RR) PACKET: 201
LENGTH     : LENGTH OF RTCP PACKET
SSRC       : SYNCHRONOUS TRANSMISSION ORIGIN IDENTIFIER
             FOR IDENTIFYING A PACKET TRANSMISSION ORIGIN
NTP        : NETWORK TIME PROTOCOL
```

Fig.9A

ROUTE QUALITY TABLE 1

MG NUMBER 1

| | AVERAGE PACKET DROP RATE | AVERAGE JITTER INTERVAL |
|---|---|---|
| ROUTE 1 | 18 | 280 |
| ROUTE 2 | 5 | 180 |
| ROUTE 3 | 10 | 200 |

Fig.9B

ROUTE QUALITY TABLE 2

MG NUMBER 1 / MG NUMBER 2

| | AVERAGE PACKET DROP RATE | AVERAGE JITTER INTERVAL |
|---|---|---|
| ROUTE 1 | 18 | 280 |
| ROUTE 2 | 5 | 180 |
| ROUTE 3 | 5 | 180 |
| ROUTE 1 | 18 | 280 |
| ROUTE 2 | 10 | 200 |
| ROUTE 3 | 5 | 150 |

Fig.11A

CALL STATUS TABLE

| CID | |
|---|---|
| CALL STATUS | |
| MG NUMBER | ⎫ |
| ROUTE NUMBER | ⎬ INFORMATION OF CALL ORIGINATING SIDE |
| PORT NUMBER | |
| CHANNEL NUMBER | ⎭ |
| MG NUMBER | ⎫ |
| ROUTE NUMBER | ⎬ INFORMATION OF CALL TERMINATING SIDE |
| PORT NUMBER | |
| CHANNEL NUMBER | ⎭ |

Fig.11B

CALL INFORMATION TABLE FOR EACH ROUTE

| ROUTE NUMBER | |
|---|---|
| NUMBER OF CALLS (4) | |
| CID (1) | |
| CID (2) | |
| CID (3) | |
| CID (4) | |

Fig.11C

QUALITY MANAGEMENT TABLE FOR EACH CALL

| CID | Value | |
|---|---|---|
| CID (1) | 5 | ← PACKET DROP RATE |
| | 200 | ← JITTER INTERVAL |
| CID (2) | 45 | |
| | 400 | |
| CID (3) | 15 | |
| | 250 | |
| CID (4) | 18 | |
| | 300 | |

METHOD OF CONTROLLING CHANGE-OVER OF CONNECTION ROUTE BETWEEN MEDIA GATEWAY APPARATUSES, AND CALL AGENT APPARATUS

BACKGROUND OF THE INVENTION

1. Field of the Invention

The present invention relates to a method of controlling change-over of a connection route between media gateway apparatuses, and a call agent apparatus. FIG. 15 shows a network connection structure of a call agent apparatus and media gateway apparatuses. Each media gateway apparatus MG is positioned between a public switched telephone network (PSTN) and an Internet protocol communication network (hereinafter to be referred to as an IP network), and has a gateway function for connecting between a subscriber accommodation switch LS and a router by converting a transmission system.

The call agent apparatus CA transmits and receives signals to/from the subscriber accommodation switches LSs and the media gateway apparatuses MGs, and issues a call connection instruction and a service instruction to the media gateway apparatuses MGs. Each media gateway apparatus MG and the call agent apparatus CA connect the public switched telephone network (PSTN) with the IP network, thereby to prepare a sound/data integrated network based on a composite network formed with the public switched telephone network (PSTN) and the IP network.

The call agent apparatus CA and the subscriber accommodation switch LS transmit and receive signals to/from each other based on a common channel signal system SS7. The call agent apparatus CA and the media gateway apparatus MG transmit and receive signals to/from each other based on the protocol of the H.248 recommendation (hereinafter to be referred to as the H248 protocol) by the ITU-T (International Telecommunication Union-Telecommunication Standardization Sector) that has prescribed the Media Gateway Control Protocol (MGCP).

Transmission of various kinds of multi-media information on the IP network is not guaranteed to have high quality and high reliability in transmission as do those, guaranteed for voice transmission, that use a conventional fixed band line of the public switched telephone network (PSTN). Even during communications, the band that can be used and the packet arrival time vary depending on the state of use of the IP network. Therefore, when there occurs a substantial delay in the packet arrival time or when the packet abandon rate becomes high for the media that require real-time transmission (the transmission of sound and moving pictures), the service quality is extremely deteriorated.

The present invention relates to a connection route change-over control method for maintaining the transmission quality by changing over an IP network connection route to a connection route with a better transmission quality when the quality has deteriorated during communications between the media gateway apparatuses for the media on which real-time transmission is required for voice and moving pictures, and relates to a call agent apparatus for instructing a change-over of a route to the media gateway apparatus, in a voice/data integrated network that is a composite network of the public switched telephone network (PSTN) and the IP network. The present invention can be similarly applied to a composite network of a private network of fixed band lines that is similar to the public switched telephone network (PSTN) and the IP network.

2. Description of the Related Art

Transition of a composite network between the public switched telephone network (PSTN) and the IP network will be explained with reference to FIG. 16 to FIG. 18. As is well known, long-distance transmission services are provided by a plurality of intermediate/long distance communication agents (hereinafter to be referred to as "carriers"). For example, as shown in FIG. 16, a subscriber can optionally assign and select a relay network of one carrier from among the STM relay network 16-1 of existing carriers and the STM relay networks 16-2 and 16-3 of new common carriers (NCC). A long-distance transmission service is provided via the selected relay network.

A subscriber accommodation switch LS is connected to a trunk switch TS of an existing carrier. The trunk switch (TS) of the existing carrier and the trunk switch of the new common carrier (NCC-TS) are connected to each other via a gateway switch (GS). Each carrier is equipped with a common channel signal network. Signal transfer points (STP) of the carriers are connected to each other via a gateway signal transfer point (GW-STP), thereby to relay connection control signals according to the common channel signal system that is common to each carrier.

The existing and new STM relay networks 16-1, 16-2 and 16-3 provide long-distance transmission services via the trunk switches TS and NCC-TS within the carriers respectively in the synchronous transfer mode (STM). FIG. 16 shows a case where the STM relay networks 16-1 and 16-2 transmit control signals on the common channel signal network, and the STM relay network 16-3 transmits control signals on separate lines corresponding to the channels for transmitting sound/data information.

When a general subscriber accommodated in the subscriber accommodation switch LS utilizes the transmission service of a new common carrier, the subscriber connects from the subscriber accommodation switch LS to the trunk switch of the new common carrier NCC-TS via the trunk switch TS of the existing carrier and the gateway switch GS, and utilizes the relay networks 16-2 and 16-3 of the new common carrier.

In the carrier networks, the distribution of sound traffic based on telephone communications has been the main method so far. However, along with the extended utilization of the Internet and the expansion of data communications within enterprises and between enterprises, the data traffic has increased, with a result that the data traffic volume has come to become larger than the voice traffic volume. Under this situation, in order to reduce cost, each carrier has been trying to shift the trunk network from the STM relay network to the communication network based on the Internet protocol (IP), and to reconstruct the network in the form having the sound/data integrated into the packet transmission network (IP/ATM).

FIG. 17 shows a trunk network of an intermediate/long distance carrier that has replaced the STM relay network with the IP network. In FIG. 17, (a) shows a trunk network according to the STM relay network, and (b) shows a trunk network according to the IP network. As shown in FIG. 17(b), the trunk network according to the IP network is constructed of a packet transfer network having a plurality of routers connected to each other, in place of the trunk switch NCC-TS and the STM relay network. As explained above, instead of building the IP network on the existing STM network, a new network is constructed having routers as a basic structure.

Unlike the STM network, the IP network of the Internet protocol base can concentrate traffic. As compared with the STM channel that always occupies a constant band, the cost of traffic becomes about 1/10 to 1/100 of the cost of the conventional STM relay network. As a result, facility cost and maintenance cost are lowered, which makes it possible to set a low charge for service utilization.

According to the connection point POI between the trunk switch TS and the gateway switch GS under the current situation (refer to FIG. 16), as the number of lines of the trunk switch TS is large, the apparatus scale of the gateway switch GS becomes large, which results in high facility cost. Therefore, the construction of the sound/data integrated network using the VoIP (Voice Over IP) technique for transmitting sound speech on the IP network based on the mutual connection of the existing carriers and new common carriers requires the following arrangement. Namely, as shown in FIG. 18, it is essential to introduce the media gateway apparatus MG that directly connects to a subscriber line from the subscriber accommodation switch LS, and media-converts sound traffic to the IP packet and delivers the IP packets to the IP network routers of the carriers.

As shown in FIG. 18, the media gateway apparatus MG directly connects to a subscriber line from the subscriber accommodation switch LS of an existing carrier, and has the IP networks of the existing and new common carriers connected in parallel to the media gateway apparatus MG. The media gateway apparatus MG transmits/receives signals to/from the call agent apparatus CA based on the H248 protocol, and the call agent apparatus CA instructs/controls a call connection.

According to an instruction from a subscriber, one IP network is selected from among the intermediate/long distance IP networks of the existing and new common carriers that are connected in parallel to the media gateway apparatus MG, and the selected IP network provides a transmission service, as in the case of the STM network. However, in the case of the IP network, new service items are required, as the IP network is based on the Internet protocol.

One of the new service items is high quality sound traffic. The STM channel switch captures a line at the time of generating a call, and occupies this line during the communications. Therefore, a constant communication band is secured, and there is substantially no variation in the transmission quality during the communications. On the other hand, the IP network is based on a best effort type transmission, as is well known. Therefore, even if a technique for securing the quality is applied within each IP network, transmission quality is clearly different between the IP networks, as the scale and the use status are different between IP networks that are connected in parallel as shown in FIG. 18.

However, an attempt to guarantee high-quality transmission service to all the subscribers who want high quality leads to a large network facility cost, with a result that there is no merit in changing from the STM relay network to the IP network. While there is, of course, an indication that IP networks will make it possible to carry out high-quality transmission in the future, the existing IP networks will continue to be used for the time being.

In this situation, a subscriber can select one carrier network of good quality at the time of originating a call by utilizing a function similar to a minimum charge line automatic selection function (LCR: Least Cost Routing). However, the subscriber can select this function only at the time of originating a call. There will also be introduced a service like "my line service" that enables a subscriber to originate a call without being conscious of network selection at the time of the call origination, based on registration, in advance, of a carrier network to be used for each connection section. However, the subscriber can select this function only at the time of originating a call, as well. The subscriber cannot change the selection during the communication.

There has also been a proposal of constructing a high-quality network by using a path protection structure that uses the MPLS (Multi Protocol Label Switching) technique. This MPLS technique is for executing a mutual connection of carrier networks or applying network policy control to the mutual connection such that this connection can be regarded as a connection in one network, thereby to avoid deterioration in the transmission quality due to a transmission delay or trouble in the network apparatus.

However, for constructing this network, it is necessary to replace all the installed network apparatuses like routers with apparatuses that are adaptable to the path protection structure. It would be very expensive for each carrier to replace the existing network apparatuses, and this proposal is unrealistic.

In order to minimize the facility cost in the construction of the sound/data integrated network, it is unavoidable to effectively utilize the facilities of the existing public switched telephone network (PSTN) and the IP network. For this purpose, it is essential that the public switched telephone network (PSTN) of a fixed band line and the band-variation-type IP network are connected to each other via a media gateway apparatus MG that has a media conversion function, thereby to construct the sound/data integrated network.

In the structure of the voice/data integrated network, it is necessary to restrict, as far as possible, quality degradation, due to packet delay and loss, in the media that require real-time transmission (the transmission of sound and moving pictures). Regarding the media that require strict real time transmission (particularly sound transmission), "Sound gateway apparatus and method of selecting path therefor" in Japanese Patent Application Laid-open Publication No. 2000-209282 has disclosed a technique for calculating a delay time at the time of capturing a channel and selecting an optimum route based on a connection response time and a transmission delay time for each voice compression. This technique is intended to improve the packet quality within a media conversion apparatus and to select a route of good packet quality at the time of a call connection. However, this technique cannot prevent a reduction in the packet quality due to a congestion of the network that has been generated after the establishment of a call connection.

In the case of a call that uses a connection route in which there occurs conspicuous delay in the packet arrival time or packet drop, it is not possible to maintain service quality. In this case, the call originator must disconnect the connected call and make a call again, and carry out a series of call setting procedures again. Further, processing cards for carrying out voice processing within a media gateway apparatus MG are packaged in high density. When a trouble occurres in these cards, the connection of a large number of calls fails. In this case, when a large number of call originators carry out a call connection again at the same time, the call agent apparatus CA is overloaded, and the call processing capacity of this call agent apparatus is lowered. As a result, the probability of loss becomes high.

SUMMARY OF THE INVENTION

It is an object of the present invention to provide a method of controlling the change-over of a connection route between media gateway apparatuses, and a call agent apparatus for instructing the change-over control, capable of maintaining transmission quality and capable of providing high-quality transmission services at low cost, by selecting a carrier network at the time of originating a call and also selecting a high-quality connection route from among a plurality of IP networks provided from carriers during a connection, in a sound/data integrated network that has existing fixed band transmission circuit networks connected with IP networks of a plurality of carriers through media gateway apparatuses.

In order to achieve the above object, according to one aspect of the present invention, there is provided a method of controlling change-over of a connection route between media gateway apparatuses, based on a voice/data integrated network that connects subscriber lines accommodated in a telephone network to an Internet protocol communication network via media gateway apparatuses, and that connects a media gateway apparatus at a call originating subscriber's line side to a media gateway apparatus at a call terminating subscriber's line side via the Internet protocol communication network, the change-over control method comprising: a step at which the media gateway apparatuses collect/edit real-time packet quality information of Internet protocol packets for each call, and transmit the packet quality information for each call to a call agent apparatus; a step at which the call agent apparatus receives packet quality information for each call transmitted from the media gateway apparatuses, updates packet quality information for each connection route based on the received packet quality information, and decides on a quality level of the call; a step at which the call agent apparatus selects a connection route of good quality based on the packet quality information for each route when a decision has been made that the quality level has been deteriorated, and transmits an instruction, for changing over the call connection route of the deteriorated quality level to the connection route of good quality, to the media gateway apparatuses; and a step at which the media gateway apparatuses change over the connection route according to the route change-over instruction received from the call agent apparatus. This aspect is characterized in that a transmission route on the IP network is changed over to an optimum route based on statistical information on the transmission quality, thereby to prevent deterioration in the transmission quality.

According to another aspect of the invention, there is provided a call agent apparatus that transmits an instruction for connecting originating/terminating calls of subscriber's lines through a connection route via an Internet protocol communication network, to media gateway apparatuses that connect the subscriber's lines accommodated in a telephone network to the Internet protocol communication network, the call agent apparatus comprising:

call quality managing means for receiving real-time packet quality information for each call transmitted from the media gateway apparatuses that have collected/edited the packet quality information, updating packet quality information for each connection route based on the received packet quality information, and deciding on a quality level of the call; change-over route determining means for selecting a connection route of good quality based on the packet quality information for each route when a decision has been made that the quality level has been deteriorated; and call control means for transmitting an instruction for changing over the call connection route of the deteriorated quality level to the connection route of good quality, to the media gateway apparatuses. This aspect is characterized in that a transmission route on the IP network is changed over to an optimum route based on statistical information on the transmission quality, thereby to prevent deterioration in the transmission quality.

According to still another aspect of the invention, there is provided a call agent apparatus of the above aspect, wherein the call quality managing means has means for receiving packet quality information that have been collected/edited by both media gateway apparatuses at the call originating subscriber's line side and the call terminating subscriber's line side, and updating packet quality information for each connection route in both media gateway apparatuses at the call originating/terminating sides, and the change-over route determining means has means for selecting a connection route of good quality based on the packet quality information for each route in both media gateway apparatuses at the call originating/terminating sides.

According to still another aspect of the invention, there is provided a call agent apparatus of the above aspect, wherein the call quality managing means has means for making a decision about whether or not a connection route of a plurality of other calls that have been connected to the same connection route is to be changed over to a connection route of good quality, according to a call quality deterioration level, and the call control means has means for transmitting an instruction for changing over the connection route of a deteriorated quality level for the plurality of other calls to a connection route of a good quality level, to the media gateway apparatuses, according to a result of the decision.

According to still another aspect of the invention, there is provided a call agent apparatus of the above aspect, wherein the call agent apparatus has means for receiving from the media gateway apparatuses information on a connection route in which trouble has occurred, and posting the information on the connection route in trouble to the call quality managing means, and the call quality managing means has means for transmitting to the change-over route determining means a request for changing over the connection route in trouble for all the calls to other connection route, whereby the call control means transmits to the media gateway apparatuses an instruction for changing over the connection route in trouble for all the calls to the connection route of good quality determined by the change-over route determining means.

BRIEF DESCRIPTION OF THE DRAWINGS

FIGS. 3A and 3B are diagrams showing a call connection processing sequence.

FIGS. 5A and 5B are route change-over sequence diagrams using quality information as a trigger according to the present invention.

FIG. 6 is a route change-over sequence diagram using quality information as a trigger according to the present invention.

FIG. 7 is a diagram showing report information of a real-time transfer control protocol (RTCP).

FIGS. 9A and 9B are diagrams showing route quality tables according to the present invention.

DETAILED DESCRIPTION OF THE PREFERRED EMBODIMENTS

Figure 1:
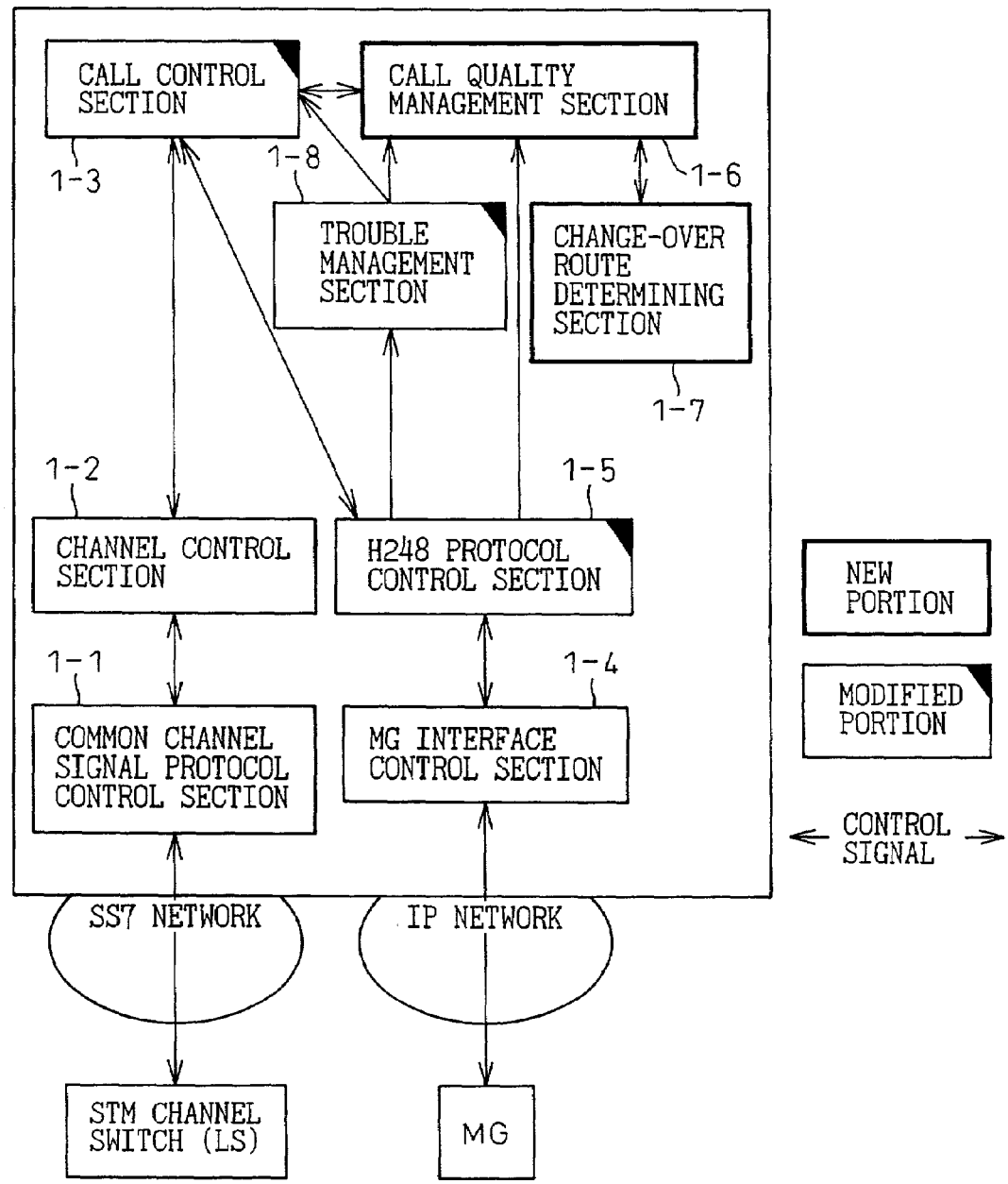
FIG. 1 is a diagram showing a structure of a call agent apparatus equipped with a route change-over control function according to the present invention.

It is possible to realize the present invention based on a modification of the existing functions of the call agent apparatus CA and the media gateway apparatuses, and the addition of new functions. FIG. 1 shows a structure of a call agent apparatus CA equipped with a route change-over control function according to the present invention. The call agent apparatus CA has the following functional sections as shown in the drawing.

A common channel signal protocol control section 1-1 has an interface function having an interface with an STM channel switch network, for executing a control of a signal transmission/reception to/from a common channel signal network and controlling protocols. A channel control section 1-2 has a channel control function for controlling an STM channel. The channel control section 1-2 executes a management of idle/busy status of the STM channel based on a post from the common channel signal protocol control section 1-1. When the STM channel is captured or released, the channel control section 1-2 posts to a call control section 1-3 together with the post information from the common channel signal protocol control section 1-1. Based on a request from the call control section 1-3, the channel control section 1-2 manages the idle/busy status of the STM channel according to the contents of the request, and transmits a request for transmitting a common channel signal to the common channel signal protocol control section 1-1.

The call control section 1-3 has a function of controlling a call. Based on a posting from the channel control section 1-2, the call control section 1-3 executes a call control according to the H248 protocol that prescribes the common channel signal system (ISUP) and the media gateway control protocol (MGCP). The call control section 1-3 stores each call information corresponding to each call. In this case, when it is necessary to transmit a common channel signal to a subscriber accommodation switch LS at the opposite station, the call control section 1-3 transmits a signal transmission request to the channel control section 1-2. When it is necessary to execute a path control to the media gateway apparatus MG, the call control section 1-3 transmits a path control request according to the H248 protocol to an H248 protocol control section 1-5. As an additional function of the present invention, the call control section 1-3 transmits a path control request to the H248 protocol control section 1-5 according to a route change request from a call quality management section 1-6.

An MG interface control section 1-4 is an interface with the media gateway apparatus MG. The MG interface control section 1-4 executes an input/output control of IP packets, and a control of a TCP/UDP connection. Based on a transmission request from the H248 protocol control section 1-5, the MG interface control section 1-4 transmits a stream of signals to the IP network on the TCP/UDP connection. Based on an input from the IP network, the MG interface control section 1-4 posts a stream of signals to the H248 protocol control section 1-5 on the TCP/UDP connection.

The H248 protocol control section 1-5 is a functional section that analyzes a message of the H248 protocol. The H248 protocol control section 1-5 analyzes the stream of the TCP/UDP connection posted from the MG interface control section 1-4 as a message of the H248 protocol. When the message is a call control message as a result of the analysis, the H248 protocol control section 1-5 posts it to the call control section 1-3. When the message is a quality information message as a result of the analysis, the H248 protocol control section 1-5 posts it to the call quality management section 1-6. When the message is a trouble information message as a result of the analysis, the H248 protocol control section 1-5 posts it to a trouble management section 1-8 (the additional function of the present invention). When there has been an H248 protocol control request from the call control section 1-3, the H248 protocol control section 1-5 generates a message of the H248 protocol according to the contents of the request, and transmits a transmission request to the MG interface control section 1-4.

The call quality management section 1-6 is an additional functional section of the present invention, and this section analyzes quality information transmitted from the media gateway apparatus MG, and stores a result of the analysis. Based on the quality information message posted from the H248 protocol control section 15, the call quality management section 1-6 stores quality information for each route, and decides on the quality level of a call. When it has been decided that it is necessary to change over the route of the call, the call quality management section 1-6 makes a request for determining a route to a change-over route determining section 1-7. The call quality management section 1-6 transmits a result of this decision and a route change request to the call control section 1-3.

When the call quality management section 1-6 has decided that it is necessary to change over the route of the call as a result of the decision made on the quality level of the call, the call quality management section 1-6 inquires, of the call control section 1-3, regarding the presence or absence of another call that is using this route. When another call, that is using this route, is found as a result of this inquiry, the call quality management section 1-6 requests the change-over route determining section 1-7 to determine a route. The call quality management section 1-6 transmits a result of this determination and a request for changing the route of a plurality of calls, to the call control section 1-3.

Further, based on the route information corresponding to an apparatus having trouble posted from the trouble management section 1-8, the call quality management section 1-6 inquires, of the call control section 1-3, regarding the presence or absence of a call that is using this route. If a call using this route is found, the call quality management section 1-6 requests the change-over route determining section 1-7 to determine a route for this call. The call quality management section 1-6 transmits a result of this determination and a request for changing the route of all the calls on this route, to the call control section 1-3.

The change-over route determining section 1-7 is an additional functional section of the present invention, and this has a function of determining a change-over destination route. In compliance with a route determination request from the call quality management section 1-6, the change-over route determining section 1-7 determines an optimum route with sufficiently good quality as an alternative route, with reference to the packet quality information for each route, based on the packet quality information from the media gateway apparatus MG at the input call originating side. Then, the change-over route determining section 1-7 posts this optimum route to the call quality management section 1-6. When there are a plurality of routes having sufficiently good quality as alternative routes, the change-over route determining section 1-7 determines an optimum route with sufficiently good quality as an alternative route, with reference to the input packet quality information for each route from the media gateway apparatus MG at the input call terminating side. Then, the change-over route determining section 1-7 posts this optimum route to the call quality management section 1-6.

The trouble management section 1-8 is a functional section that monitors trouble in the interface apparatus at the media gateway apparatus MG side. When a trouble information message has been posted from the H248 protocol control section 1-5, the trouble management section 1-8 posts route information corresponding to the apparatus in trouble to the call control section 1-3. Further, as an additional function of the present invention, the trouble management section 1-8 has a function of posting route information corresponding to the apparatus in trouble to the call quality management section 1-6.

Figure 2:
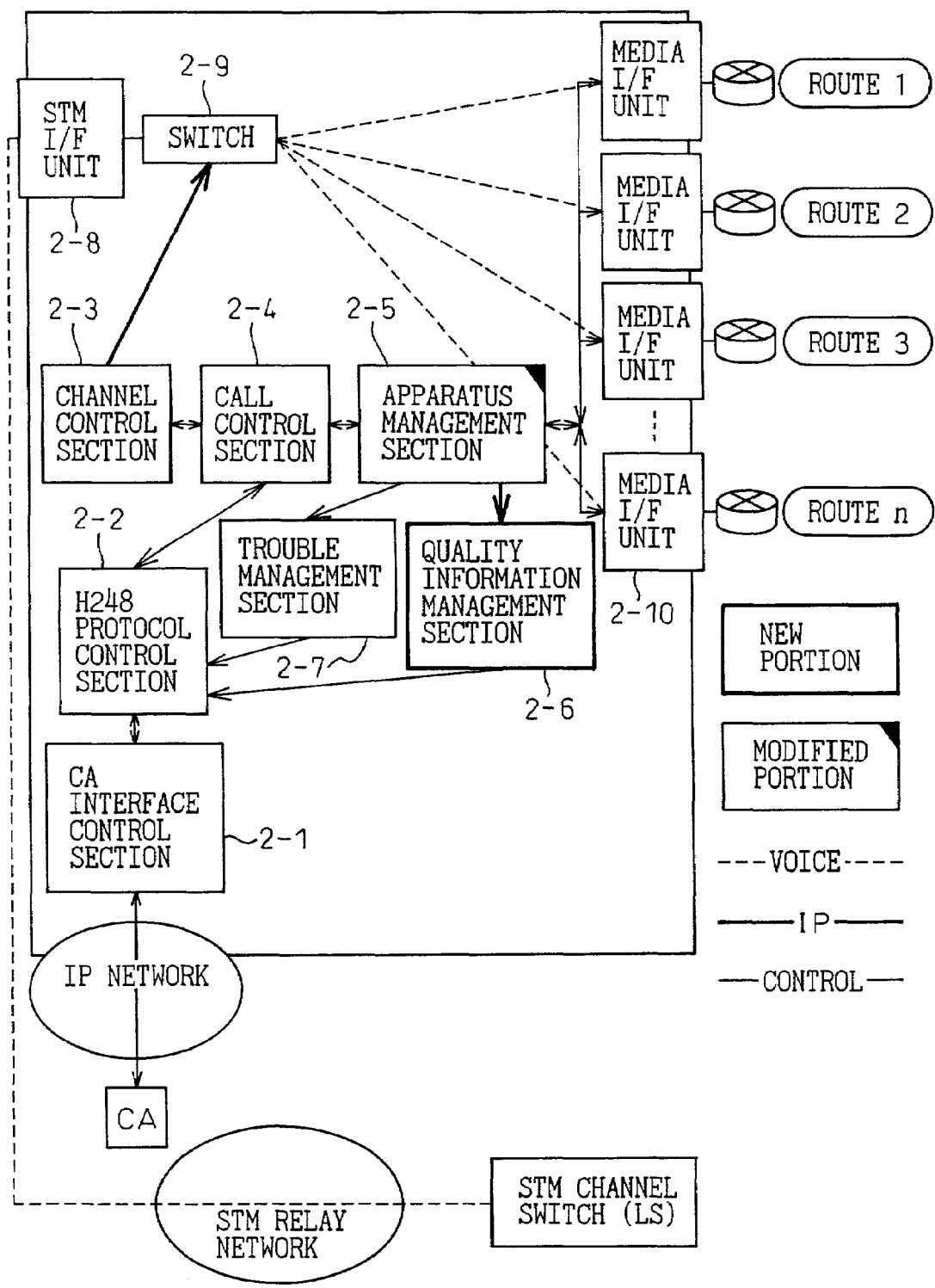
FIG. 2 is a diagram showing a structure of a media gateway apparatus that collects packet quality information according to the present invention.

Next, a structure of the media gateway apparatus MG for collecting the packet quality information according to the present invention will be explained with reference to FIG. 2. In FIG. 2, a CA interface control section 2-1 is an interface with a call agent apparatus CA. The CA interface control section 2-1 executes an input/output control of IP packets, and connection of TCP/UDP connections. Based on a request from an H248 protocol control section 2-2, the CA interface control section 2-1 transmits a stream of signals to the IP network on the TCP/UDP connection. Based on an input from the IP network, the CA interface control section 2-1 posts a stream of signals to the H248 protocol control section 2-2 on the TCP/UDP connection.

The H248 protocol control section 2-2 is a functional section that analyzes a message of the H248 protocol. The H248 protocol control section 2-2 analyzes the TCP stream posted from the MG interface control section 1-4 as a message of the H248 protocol. According to a result of the analysis, the H248 protocol control section 2-2 posts a call control message to a call control section 2-4. Further, according to a message transmission request from the call control section 2-4, a trouble management section 2-7, and a quality information management section 2-6, the H248 protocol control section 2-2 generates a message of the H248 protocol, and transmits a TCP stream transmission request to the CA interface control section 2-1.

A channel control section 2-3 has a function of controlling a switch 2-9. According to a request from the call control section 2-4, the channel control section 2-3 executes a control of changing over the connection between an STM interface apparatus 2-8 and a media interface unit 2-10 based on the make and break of the switch 2-9.

The call control section 2-4 is a call control functional section in the media gateway apparatus MG. According to the contents of a posting of a call control message from the H248 protocol control section 2-2, the call control section 2-4 determines a channel position of the STM interface apparatus 2-8 and the media interface unit 2-10 respectively, and manages path information for connecting both channels as data of information corresponding to the call. When it is necessary to control the path, the call control section 2-4 requests the channel control section 2-3 to change over the switch. When it is necessary to control the IP port, the call control section 2-4 requests an apparatus management section 2-5 to control the IP port to the media interface unit 2-10.

The apparatus management section 2-5 is a functional section that manages an apparatus accommodated in the media gateway apparatus MG. When a trouble of the media interface unit 2-10 has been detected, the apparatus management section 2-5 posts trouble apparatus information to the trouble management section 2-7. Further, the apparatus management section 2-5 receives route quality information from the media interface unit 2-10, and posts this route quality information to the quality information management section 2-6. Further, according to an IP port control request from the call control section 2-4, the apparatus management section 2-5 controls the IP port of the media interface unit 2-10, and posts a result of this control to the call control section 2-4.

The quality information management section 2-6 is an additional functional section of the present invention for generating quality information for each call. When route quality information relating to each media interface unit 2-10 has been posted from the apparatus management section 2-5, the quality information management section 2-6 generates quality information for each call, and requests the H248 protocol control section 2-2 to transmit a message.

The trouble management section 2-7 has a function of managing a trouble of an apparatus accommodated in the media gateway apparatus MG. When trouble information of the media interface unit 2-10 has been posted from the apparatus management section 2-5, the trouble management section 2-7 generates trouble information, and requests the H248 protocol control section 2-2 to transmit a message.

A route change-over operation of the call agent apparatus CA and the media gateway apparatus MG according to the present invention will be explained next. The quality information management section 2-6 that has been newly added to the media gateway apparatus MG receives packet quality information from the media interface unit 2-10 that is transmitting sound and moving pictures, via the apparatus management section 2-5. Then, the quality information management section 2-6 posts packet quality information for each call to the call agent apparatus CA via the H248 protocol control section 2-2.

The H248 protocol control section 1-5 within the call agent apparatus CA analyzes a message transmitted from the media gateway apparatus MG based on the H248 protocol, and outputs quality information for each call to the call quality management section 1-6. The call quality management section 1-6 accumulates quality information for each route, based on the quality information for each call output from the H248 protocol control section 1-5, and decides on the quality level. When it has been decided that the quality has been degraded, the call quality management section 1-6 outputs a route change-over request to the change-over route determining section 1-7.

The change-over route determining section 1-7 determines an optimum route by referring to the quality information for each route, and posts the determined optimum route to the call quality management section 1-6. The call quality management section 1-6 that has been posted with the optimum route transmits a request for changing the route to the posted optimum route, to the call control section 1-3. Upon receiving the request for changing the route, the call control section 1-3 sends a request to the media gateway apparatus MG to change over the route, via the H248 protocol control section 1-5. Based on this, the media gateway apparatus MG changes over the route of which quality has been decided as deteriorated for the call to an optimum route having good quality.

When a plurality of optimum routes exist at the time when the change-over route determining section 1-7 within the call agent apparatus CA is to determine an optimum route based on the already accumulated quality information from the media gateway apparatus MG at the call originating side, the change-over route determining section 1-7 determines an optimum route based on the already accumulated quality information from the media gateway apparatus MG at the opposite call terminating side. As a result, it becomes possible to change over the route to an optimum route having good quality in the media gateway apparatuses MG at both call originating/terminating sides.

When the call quality management section 1-6 accommodated in the call agent apparatus CA has decided that it is necessary to change over the route of a plurality of calls as a result of a decision made on the quality level, the call quality management section 1-6 inquires, of the call control section 1-3, regarding calls that are using the route that should be changed over. Then, the call quality management section 1-6 transmits a request for changing the route of these calls, to the call control section 1-3. As a result, it becomes possible to change over the route of a plurality of calls at the same time.

The trouble management section 1-8 accommodated in the call agent apparatus CA receives information, on the trouble route, transmitted from the trouble management section 2-7 accommodated in the media gateway apparatus MG, via the H248 protocol control section 1-5, and transmits this information on the trouble route to the call quality management section 1-6. As a result, it becomes possible to change over the route, in trouble, of the call to a route having good transmission quality.

An example of the operation of the present invention will be explained below. The following assumption is applied to an example of the operation. There are two levels of call deterioration. At a first low deterioration level, a packet abandon rate is equal to or above 20% and less than 40%, or a jitter (a fluctuation in a packet arrival time) interval is equal to or above 300 ms and less than 500 ms. As a second high deterioration level, a packet abandon rate is equal to or above 40%, or a jitter interval is equal to or above 500 ms. When the quality deterioration level of a call is at the first deterioration level, the connection route is changed over for only this call. When the quality deterioration level of a call is at the second deterioration level, the connection route is changed over for this call and other calls that are using the same connection route. In this case, the rate of executing the route change-over (hereinafter to be referred to as "a call number yardstick") is set to 50%.

First, a sequence of processing up to a call connection will be explained with reference to a call connection sequence diagram shown in FIGS. 3A and 3B. When a subscriber A has dialed a telephone number of a subscriber B to communicate with the subscriber B, a subscriber accommodation switch LS1 that accommodates the subscriber A transmits an IAM (Initial Address Message) signal including the telephone number of the called subscriber B to a call agent apparatus CA (3-1).

The call agent apparatus CA that has received this IAM signal transmits a channel number of the subscriber accommodation switch LS1 and route information (an originating IP address) to a media gateway apparatus MG1 that has drawn a subscriber's line of the subscriber accommodation switch LS1 (3-2). The media gateway apparatus MG1 that has received this information transmits an ACK (Acknowledgement) signal including an originating UDP port number to the call agent apparatus CA (3-3).

The call agent apparatus CA that has received the originating UDP port number of the media gateway apparatus MG1 transmits the route information (the originating IP address) and the UDP port number of the media gateway apparatus MG1 and route information (a terminating IP address) of a media gateway apparatus MG2, to the media gateway apparatus MG2 that has drawn a subscriber's line of a subscriber accommodation switch LS2 that accommodates the called subscriber B (3-4).

The media gateway apparatus MG2 that has received the route information (the originating IP address) and the UDP port number of the media gateway apparatus MG1 and the route information (a terminating IP address) of the media gateway apparatus MG2 transmits a channel number and a terminating UDP port number of the subscriber accommodation switch LS2 to the call agent apparatus CA (3-5). The call agent apparatus CA that has received this information transmits an IAM signal according to a common channel signal, to the subscriber accommodation switch LS2 that is connected to the media gateway apparatus MG2 (3-6).

The subscriber accommodation switch LS2 that has received the IAM signal drives a ringer of the subscriber B to sound, and transmits an ACM (Address Complete Message) signal to the call agent apparatus CA to post that the subscriber B has been called (3-7). The call agent apparatus CA that has received this posting transmits the route information (the IP address) and the UDP port number of the media gateway apparatus MG2 to the media gateway apparatus MG1 (3-8).

The media gateway apparatus MG1 that has received this information transmits an ACK signal to the call agent apparatus CA (3-9). The call agent apparatus CA that has received the ACK signal from the media gateway apparatus MG1 transmits an ACM signal to the subscriber accommodation switch LS1 (3-10). The subscriber accommodation switch LS1 that has received the ACM signal recognizes that that subscriber B has been called, and transmits a ring-back tone (RBT) to the subscriber A.

When the subscriber B has responded to the call termination, the subscriber accommodation switch LS2 transmits an ANM (Answer Message) signal to the call agent apparatus CA (3-11). The call agent apparatus CA that has received the ANM signal transmits the received ANM signal to the subscriber accommodation switch LS1 (312). As a result, the subscriber A of the subscriber accommodation switch LS1 and the subscriber B of the subscriber accommodation switch LS2 can communicate with each other via the media gateway apparatuses MG1 and MG2 that are connected to each other on the IP network (313). The communications carried out using the IP network are executed based on packet transmission using the real-time transfer protocol (RTP). FIGS. 3A and 3B also show a subsequent sequence of call disconnection processing. However, as this disconnection processing has no direct relationship with the operation of the present invention, the explanation of this processing will be omitted.

Figure 4:
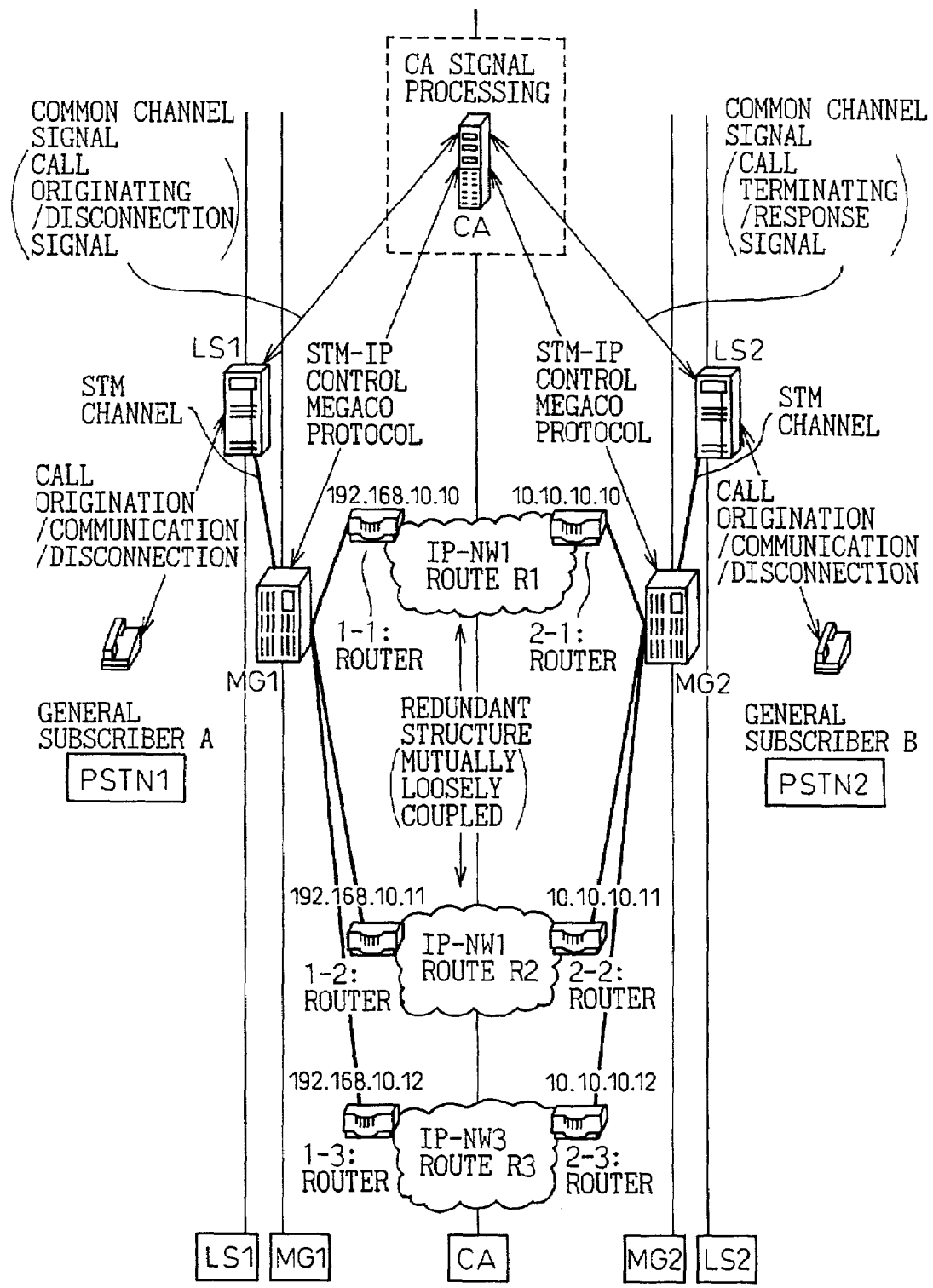
FIG. 4 is a diagram showing a network structure according to an embodiment of the present invention.

Assume that, as a result of the call connection processing of the above sequence, the media gateway apparatus MG1 at the call originating side and the media gateway apparatus MG2 at the call terminating side have been connected to each other via a route r1 of an IP network IP-NW1 shown in FIG. 4. Also assume that the IP address of the router of the media gateway apparatus MG1 at the call originating side used in the route r1 is 192.168.10.10, and that the IP address of the router of the media gateway apparatus MG2 at the call terminating side is 10.10.10.10.

Between the media gateway apparatuses MG1 and MG2, there are also other usable connection routes including a route r2 of an IP network IP-NW2 and a route r3 of an IP network IP-NW3. Assume that the IP address of the router of the media gateway apparatus MG1 used in the route r2 is 192.168.10.11, and the IP address of the router of the media gateway apparatus MG1 used in the route r3 is 192.168.10.12. Also assume that the IP address of the router of the media gateway apparatus MG2 used in the route r2 is 10.10.10.11, and the IP address of the router of the media gateway apparatus MG2 used in the route r3 is 10.10.10.12.

Next, an example of executing a route change-over operation by using quality information as a trigger will be explained with reference to FIG. 5A to FIG. 10. The media interface unit 2-10 directed to the route r1 at the media gateway apparatus MG1 side transmits packet quality information (a packet drop rate, a jitter interval, etc.) of the real-time transfer control protocol (RTCP) of a call under connection, to the quality information management section 2-6 via the apparatus management section 2-5.

FIG. 7 shows report information of the real-time transfer control protocol (RTCP). This report information is issued for each call. This report information includes information relating to the quality management of a packet transmission such as a packet drop rate, a cumulative number of dropped packets, an arrival time jitter, etc. This is the protocol already recommended.

Figure 8A:
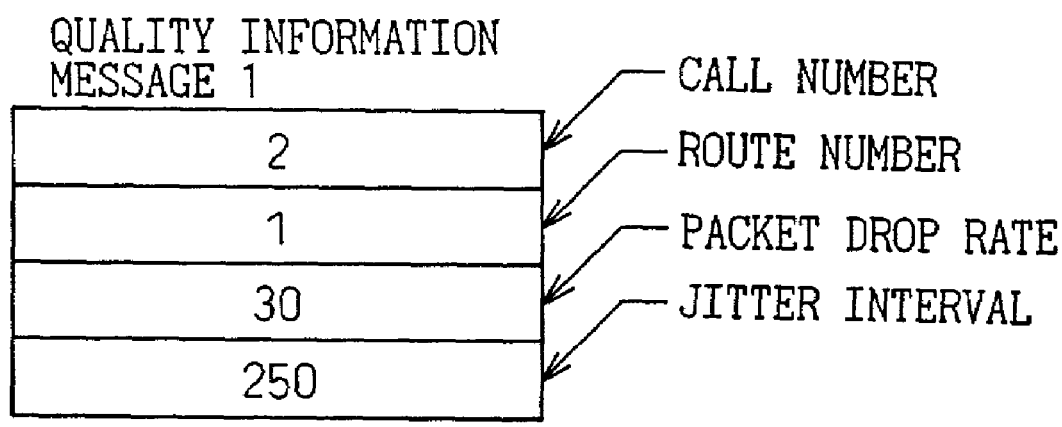
FIGS. 8A and 8B are diagrams showing quality information messages according to the present invention.
Figure 8B:
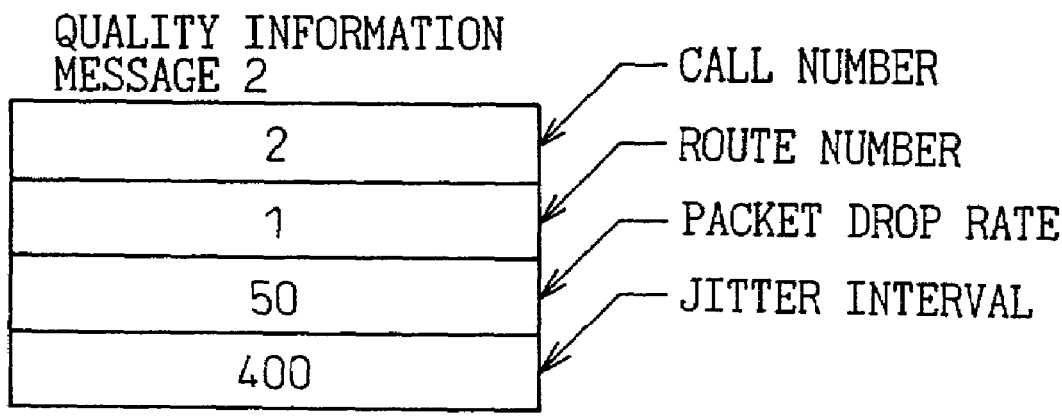
Figure 10:
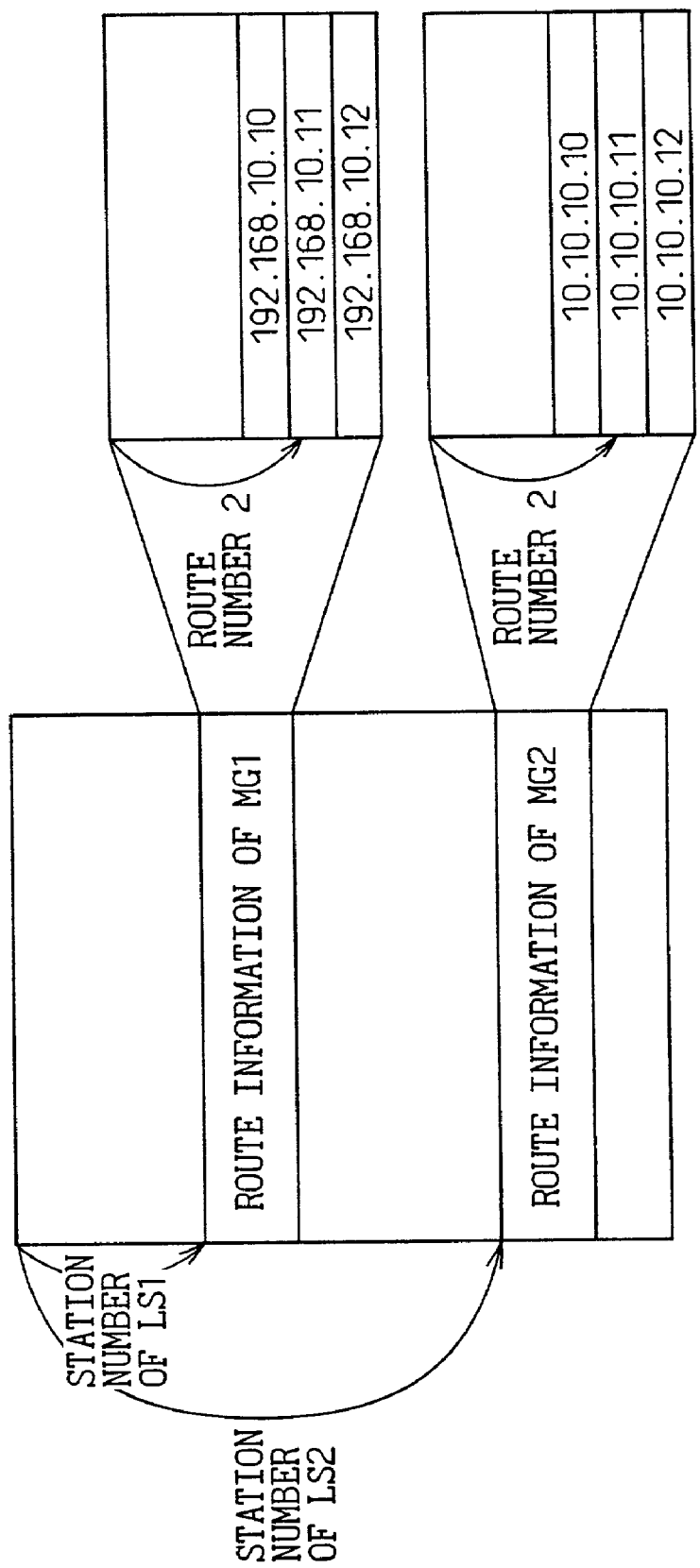
FIG. 10 is a diagram showing station data according to the present invention.

The quality information management section 2-6 edits the packet quality information of the received real-time transfer control protocol (RTCP), and transmits the edited information as a quality information message (FIG. 8(a)) to the call agent apparatus CA via the H248 protocol control section 2-2. The quality information message includes a call number, a route number, a packet drop rate, and a jitter interval as shown in FIGS. 8A and 8B.

Figure 14:
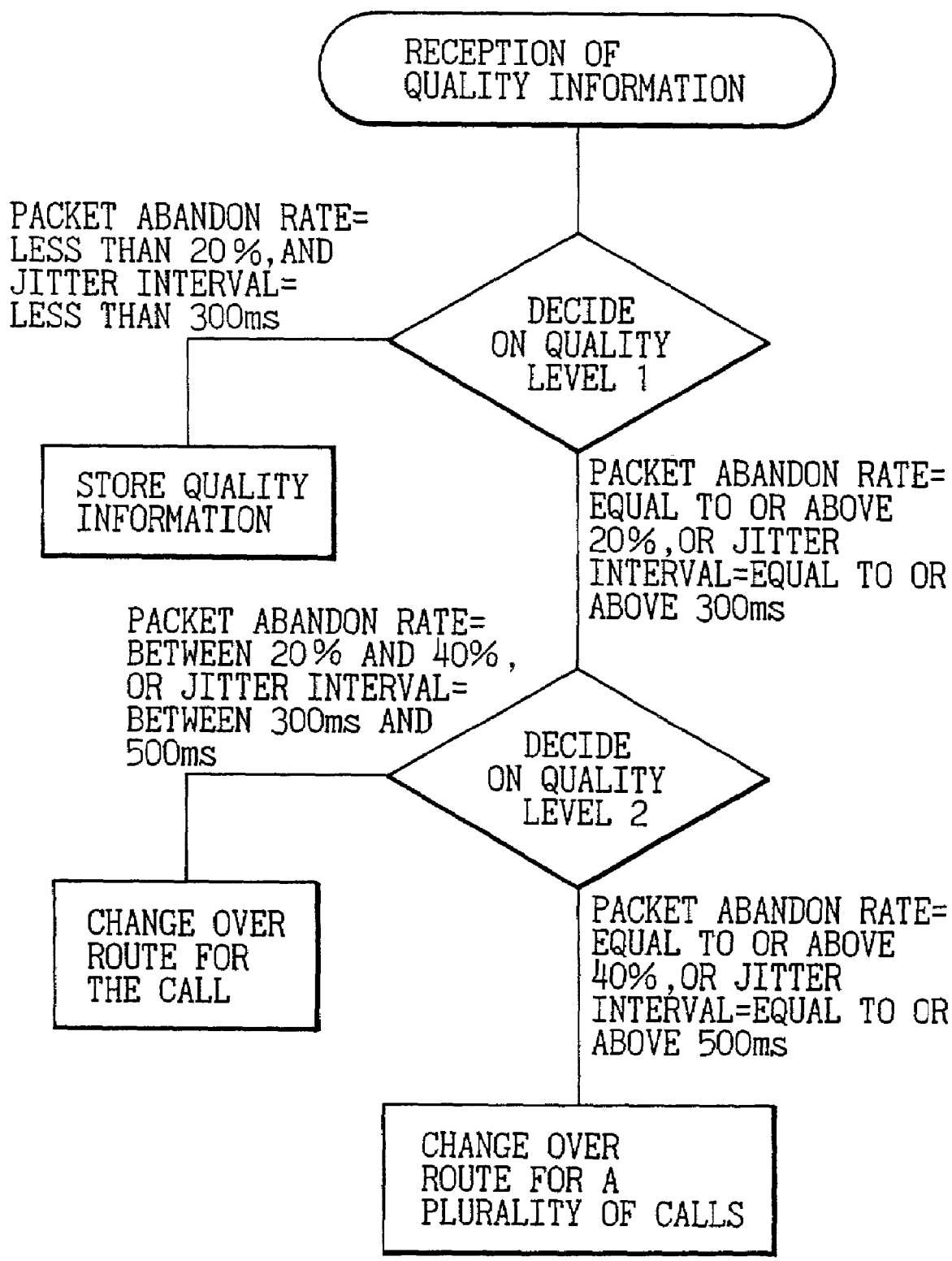
FIG. 14 is a diagram showing a quality level decision procedure according to the present invention.
Figure 15:
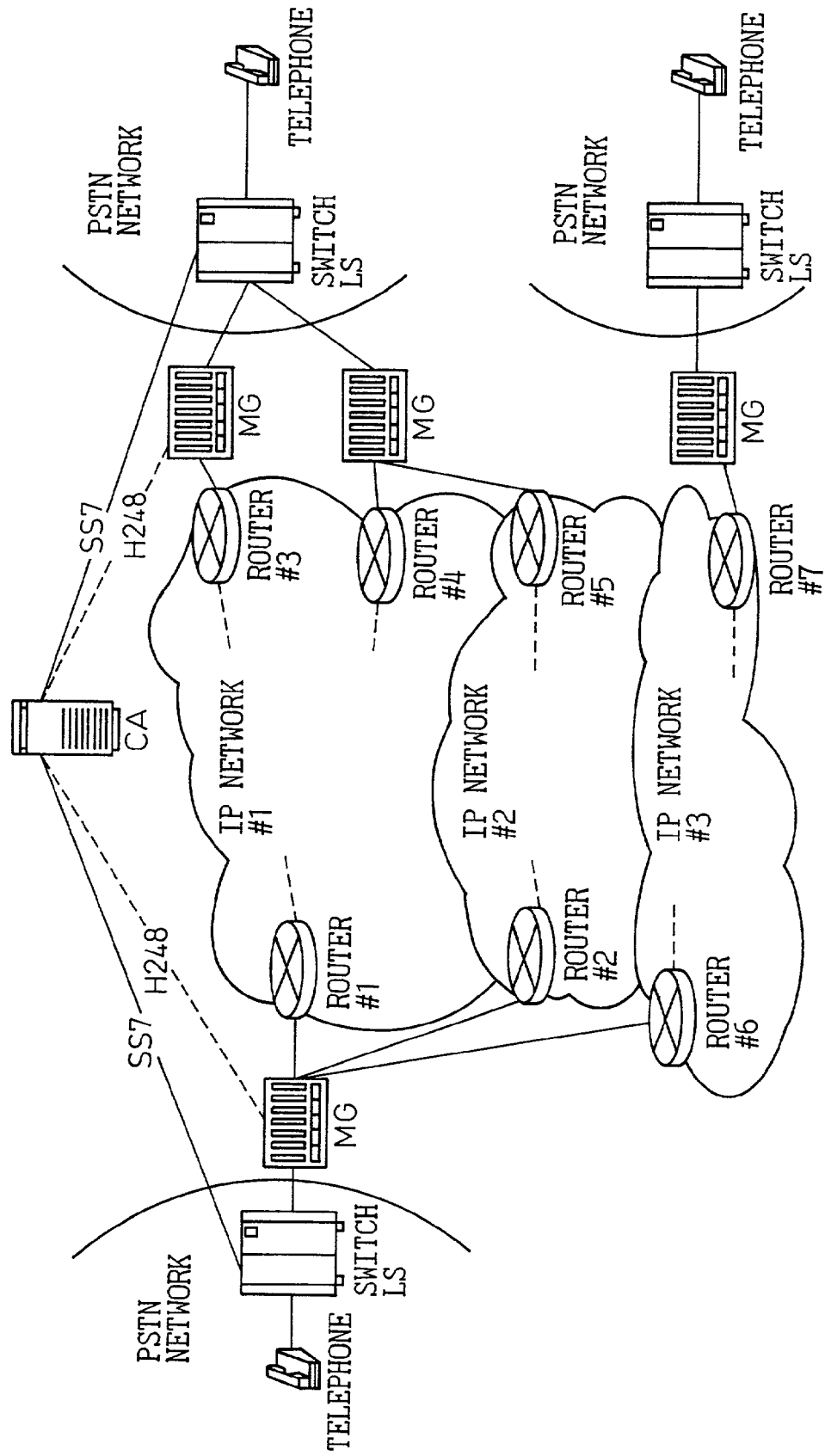
FIG. 15 is a diagram showing a network connection structure of a call agent apparatus and media gateway apparatuses.
Figure 16:
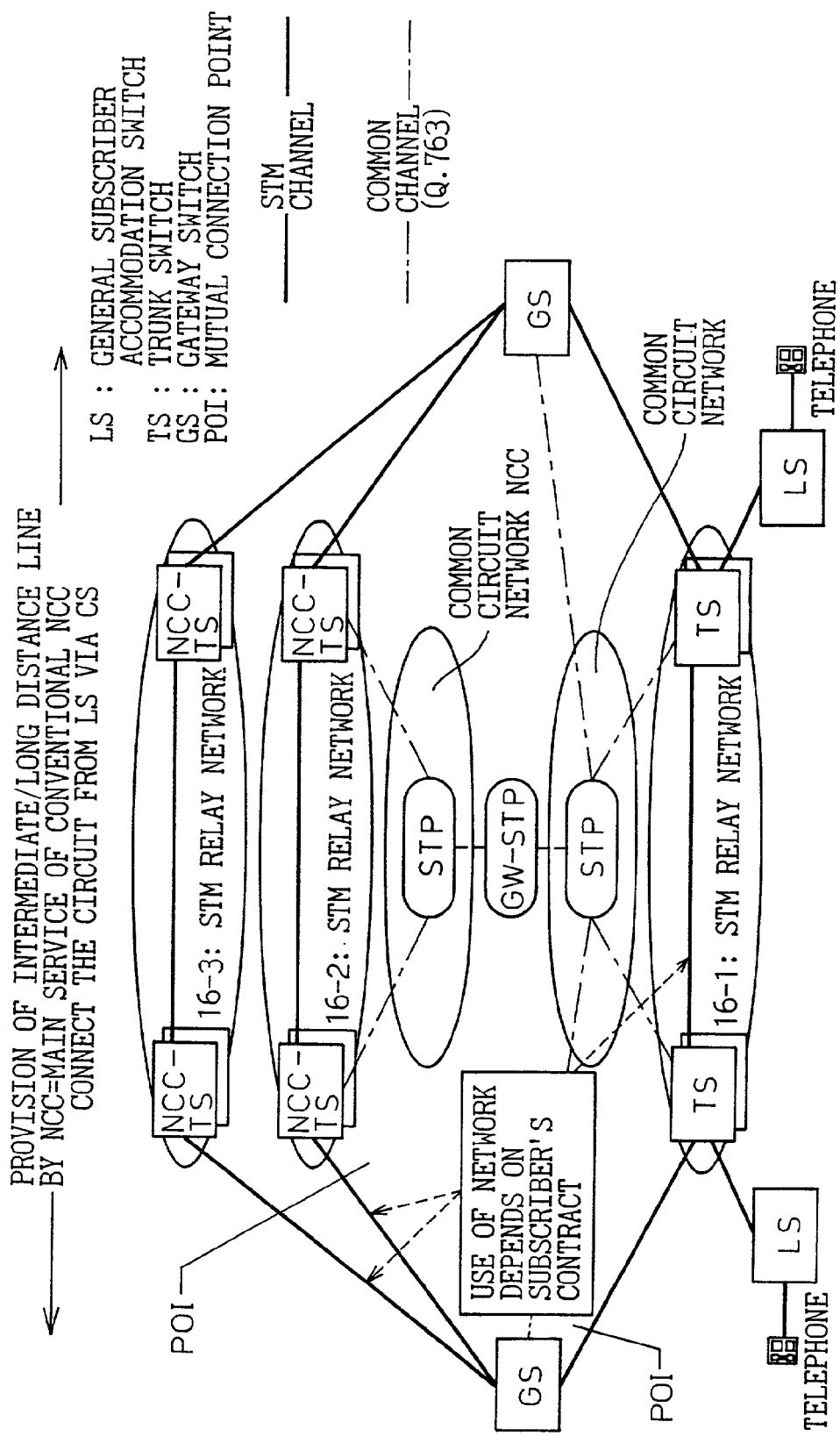
FIG. 16 is a diagram showing a conventional network structure according to an STM relay network of intermediate/long distance carriers.
Figure 17:
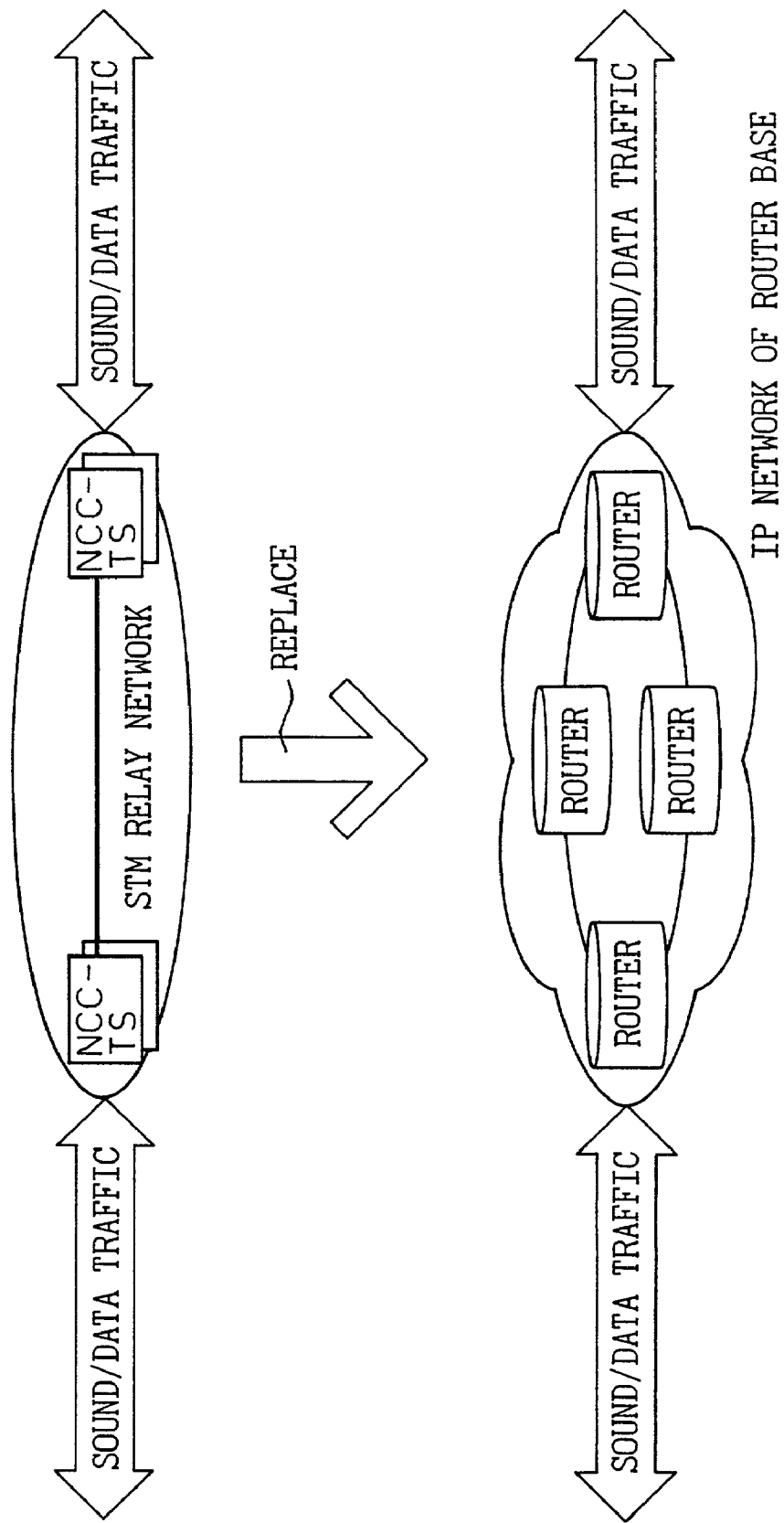
FIG. 17 is a diagram showing a trunk network that has replaced an STM relay network with an IP network.
Figure 18:
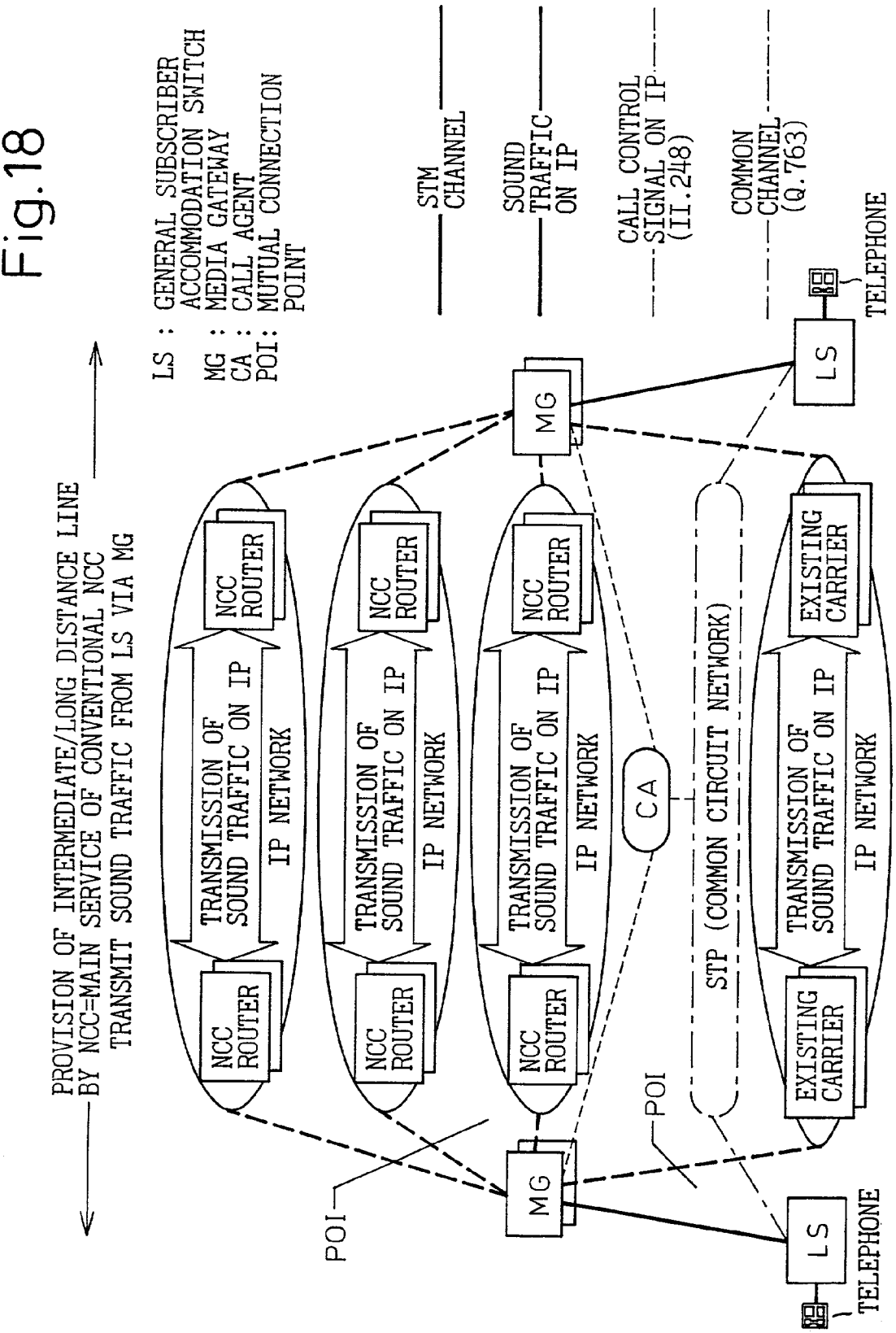
FIG. 18 is a diagram showing a network structure according to a trunk network of IP networks and media gateway apparatuses.

In the call agent apparatus CA, when the call quality management section 1-6 has received the quality information message via the MG interface control section 1-4 and the H248 protocol control section as shown in the sequence diagram in FIG. 5A (5-1), the call quality management section 1-6 compares the received quality information with a threshold value, and decides whether it is necessary to change over the route or not, according to a quality level decision procedure shown in FIG. 14.

Assume that the received quality information is that the packet drop rate is equal to 30% and the jitter interval is equal to 250 ms. This packet drop rate exceeds the packet drop rate of 20% as the first threshold value of quality deterioration level. This packet drop rate and the jitter rate are less than the second threshold value of quality deterioration level (the packet abandon rate 40%, and the jitter interval 500 ms). Therefore, the call quality management section 1-6 makes a decision that the service quality has been deteriorated to some extent, and requests the change-over route determining section 1-7 to change over the route (5-2).

The change-over route determining section 1-7 that has received this request searches a route quality table (FIG. 9A) for a route of the best quality, determines the route r2 as the route of the best quality, and informs the call quality management section 1-6 of the determined route r2 (5-3). The call quality management section 1-6 transmits a request for changing over the route r-1 to the route r2, to the call control section 1-3 (5-4). The call control section 1-3 that has received the route change-over request refers to station data (FIG. 10), and determines the IP address (192.168.10.11) of the route r2 from the route information and the route number 2 of the media gateway apparatus MG1. The call control section 1-3 then edits the route change-over request message, and transmits a move message to the H248 protocol control section 1-5.

The H248 protocol control section 1-5 transmits the route change-over request (move) message to the media gateway apparatus MG1 via the MG interface control section 1-4 (5-5), according to the H248 protocol (5-6). At the media gateway apparatus MG1 side, the H248 protocol control section 2-2 receives the route changeover request via the CA interface control section 2-1, analyzes the message, and transmits a route change-over request message to the call control section 2-4.

The call control section 2-4 that has received the route change-over request message transmits a request for opening a new UDP port to the media interface unit 2-10 of the new route via the apparatus management section 2-5. Then, the call control section 2-4 receives a new UDP port number (1234) from the media interface unit 2-10 of the new route via the apparatus management section 2-5. The call control section 2-4 makes the H248 protocol control section 2-2 edit this new UDP port number (1234) into a move message, and transmits this move message to the call agent apparatus CA (6-1).

Figure 11:
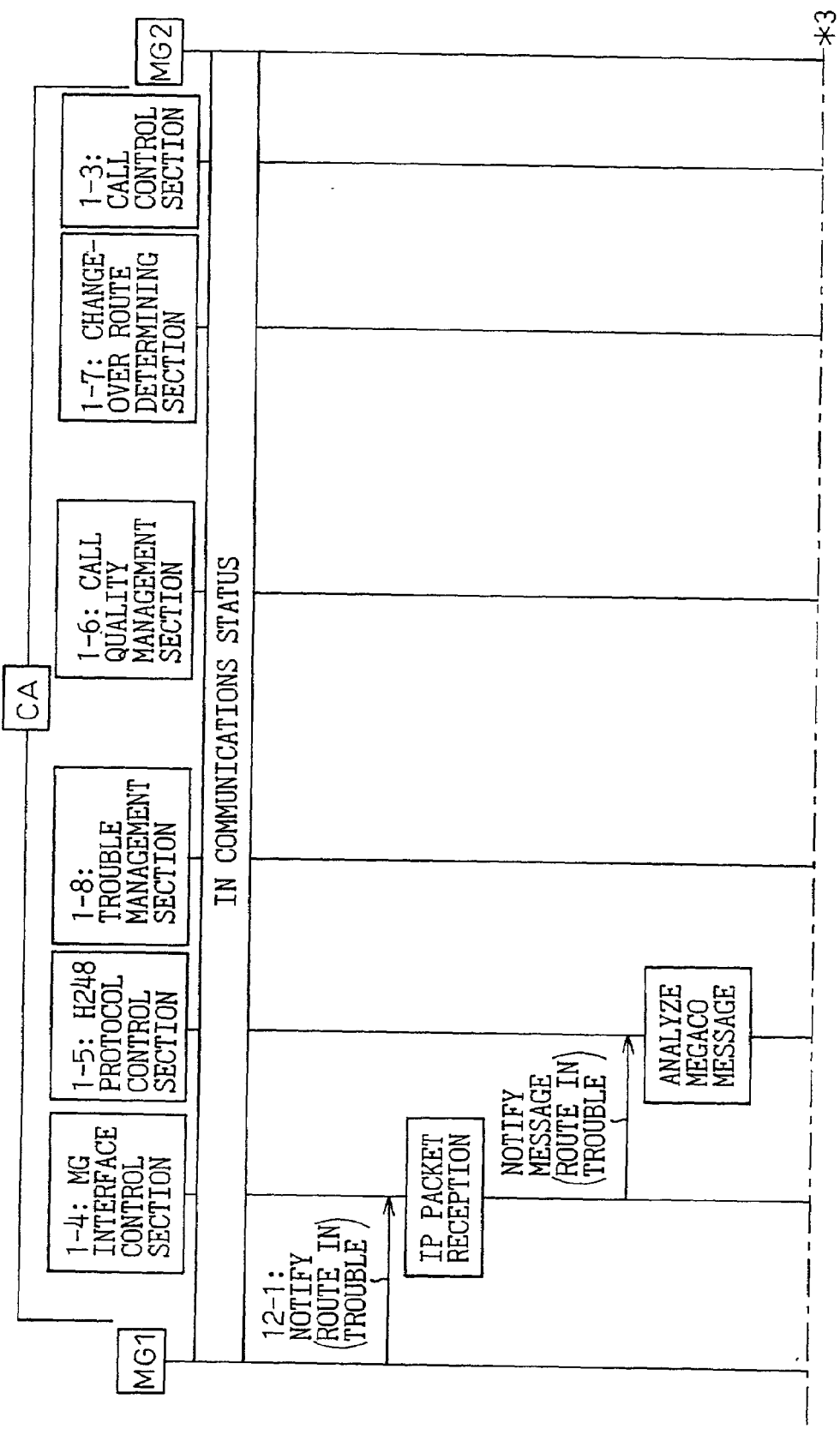
FIGS. 11A, 11B and 11C are diagrams showing a call status table, a call information table, and a quality management table respectively according to the present invention.

In the call agent apparatus CA, the H248 protocol control section 1-5 analyzes the move message received via the MG interface control section 1-4 (6-2), and posts the new UDP port number (1234) to the call control section 1-3 (6-3). The call control section 1-3 updates the port number of the call originating side information in a call status table (FIG. 11A), and transmits the IP address (192.168.10.11) of the new route r2 and the new UDP port number (1234) of the media gateway apparatus MG1 and the IP address (10.10.10.11) of the new route r2 of the opposite media gateway apparatus MG2, to the media gateway apparatus MG2 via the H248 protocol control section 1-5 and the MG interface control section 1-4 (64).

The media gateway apparatus MG2 transmits a new UDP port number (1235) for the IP address (10.10.10.11) of the new route r2 to the call agent apparatus CA via the H248 protocol control section 2-2, based on the information received via the CA interface control section 2-1. The call agent apparatus CA receives the move message received via the MG interface control section 14, and the H248 protocol control section 1-5 analyzes the message. The call agent apparatus CA then posts the new UDP port number (1235) of the media gateway apparatus MG2 to the call control section 1-3 (6-5). The call control section 1-3 that has received the new UDP port number (1235) updates the port number of the call terminating side information in the call status table (FIG. 11A), edits the move message with the new UDP port number (1235) of the media gateway apparatus MG2, and transits the edited move message to the media gateway apparatus MG1 via the H248 protocol control section 1-5 (6-6).

The media gateway apparatus MG1 that has received the move message transmits a move reply message to the call agent apparatus CA (6-7). Based on the reception of the move reply message, the call control section 1-3 of the call agent apparatus CA transmits an instruction for changing over the connection route r1 to the route r2, to the media gateway apparatuses MG1 and MG2. The media gateway apparatuses MG1 and MG2 change over the connection route to the route r2 according to this instruction. As a result, the subscribers can change over the connection route from the route r1 to the route r2 without a need for the re-connection. Consequently, the subscribers can communicate with each other through the connection route having good transmission quality (68).

Next, there will be explained an example of an operation of the change-over route determining section 1-7 that determines an optimum route in the media gateway apparatuses MGs at both the call originating and terminating sides with reference to the quality information of these media gateway apparatuses. In this operation example, in a similar manner to that explained for the above operation example, the change-over route determining section 1-7 searches a route quality table (FIG. 9B) that accumulates the quality information, for a plurality of routes of good quality (the route r2 and the route r3 in the example shown), at the time of determining an optimum route from the media gateway apparatus MG1. Further, the change-over route determining section 1-7 searches a route quality table (FIG. 9B) at the opposite media gateway apparatus MG2 side, and determines the route r3 having good quality at the media gateway apparatus MG2 as the optimum route. In this way, the change-over route determining section 1-7 determines the optimum route by referring to the quality information at both opposite media gateway apparatuses MG1 and MG2.

Next, there will be explained an example of a route change-over operation for changing over a route that other optional number of calls are using. The call quality management section 1-6 receives a quality information message (FIG. 8B) transmitted from the media gateway apparatus MG1, and compares a packet drop rate 50% and a jitter interval 400 ms in this quality information message with the packet drop rate 40% and the jitter interval 500 ms of the second quality deterioration level. As the packet abandon rate exceeds the threshold value, the call quality management section 1-6 decides that the service quality has been deteriorated. The call quality management section 1-6 requests the call control section 1-3 for the information on calls that are using this connection route (the route r1), in order to change over the route r1 to other route for other plurality of call that are using the route r1.

The call control section 1-3 that has received this request refers to the call information table for each call (FIG. 11B), and posts call numbers CID (1), CID (2), CID (3), and CID (4) to the call quality management section 1-6. In order to determine the number of calls for which the route is to be changed, the call quality management section 1-6 multiplies the call number yardstick 50% to the posted number of calls (=4) thereby to obtain the change-over call number (=2). The call quality management section 1-6 sequentially searches a quality management table for each call (FIG. 11C) by the number of calls in the order of poor quality information, and determines the call numbers CID (2) and CID (4) as the calls for which the route is to be changed over.

In order to change over the route for the calls of the call numbers CID (2) and CID (4), the call quality management section 1-6 requests the change-over route determining section 1-7 to change over the route. The change-over route determining section 1-7 that has received this request refers to the route quality table (FIG. 9A), determines the route r2 as an optimum route, and posts the route r2 to the call quality management section 1-6. The call quality management section 1-6 that has received this posting posts a request for changing over the route of the calls of the call numbers CID (2) and CID (4) to the route r2, to the call control section 1-3. The call control section 1-3 changes over the route of the calls of the call numbers CID (2) and CID (4) from the route r1 to the route r2.

Figure 12:
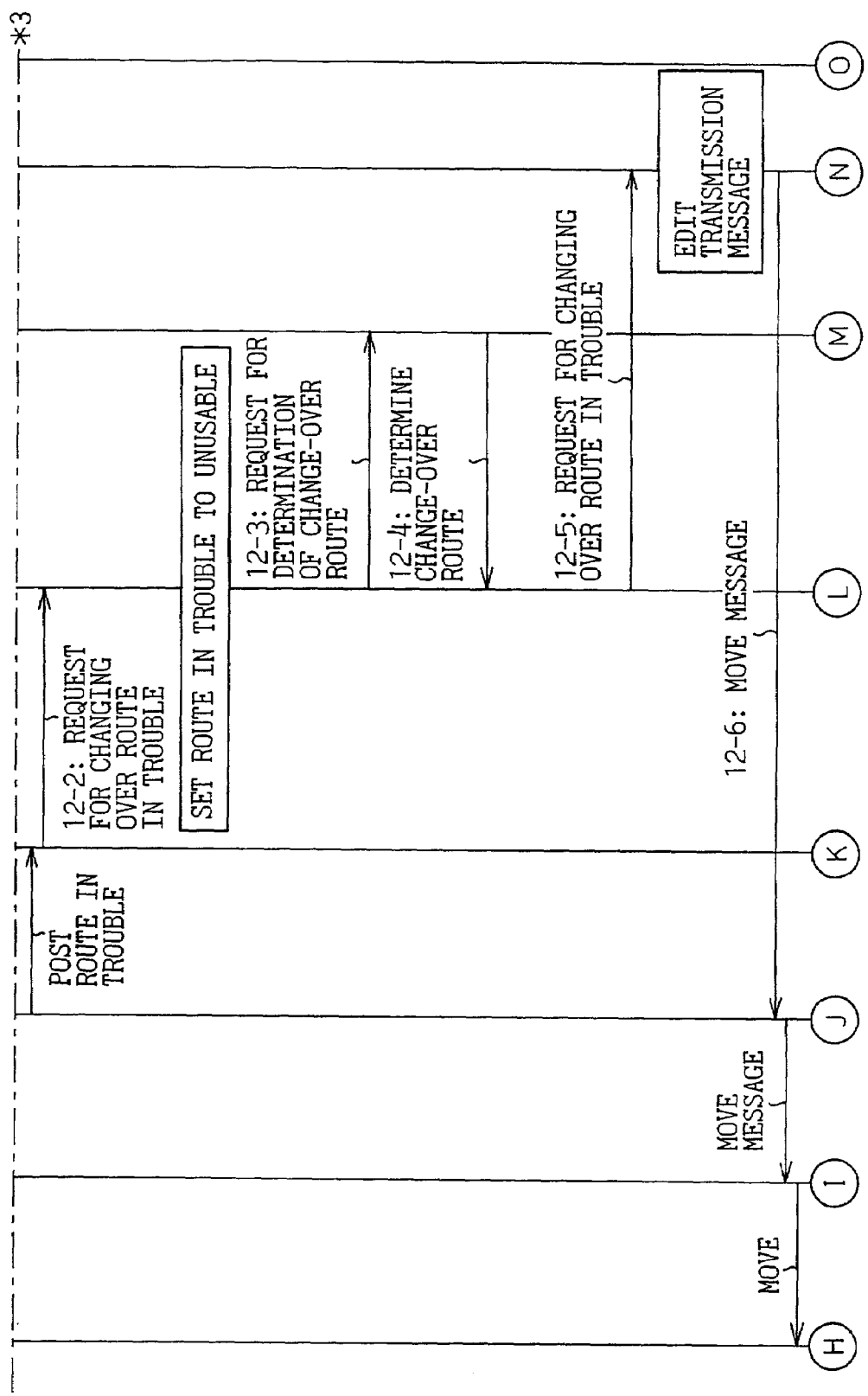
FIGS. 12A and 12B are route change-over sequence diagrams using a trouble detection as a trigger according to the present invention.
Figure 13:
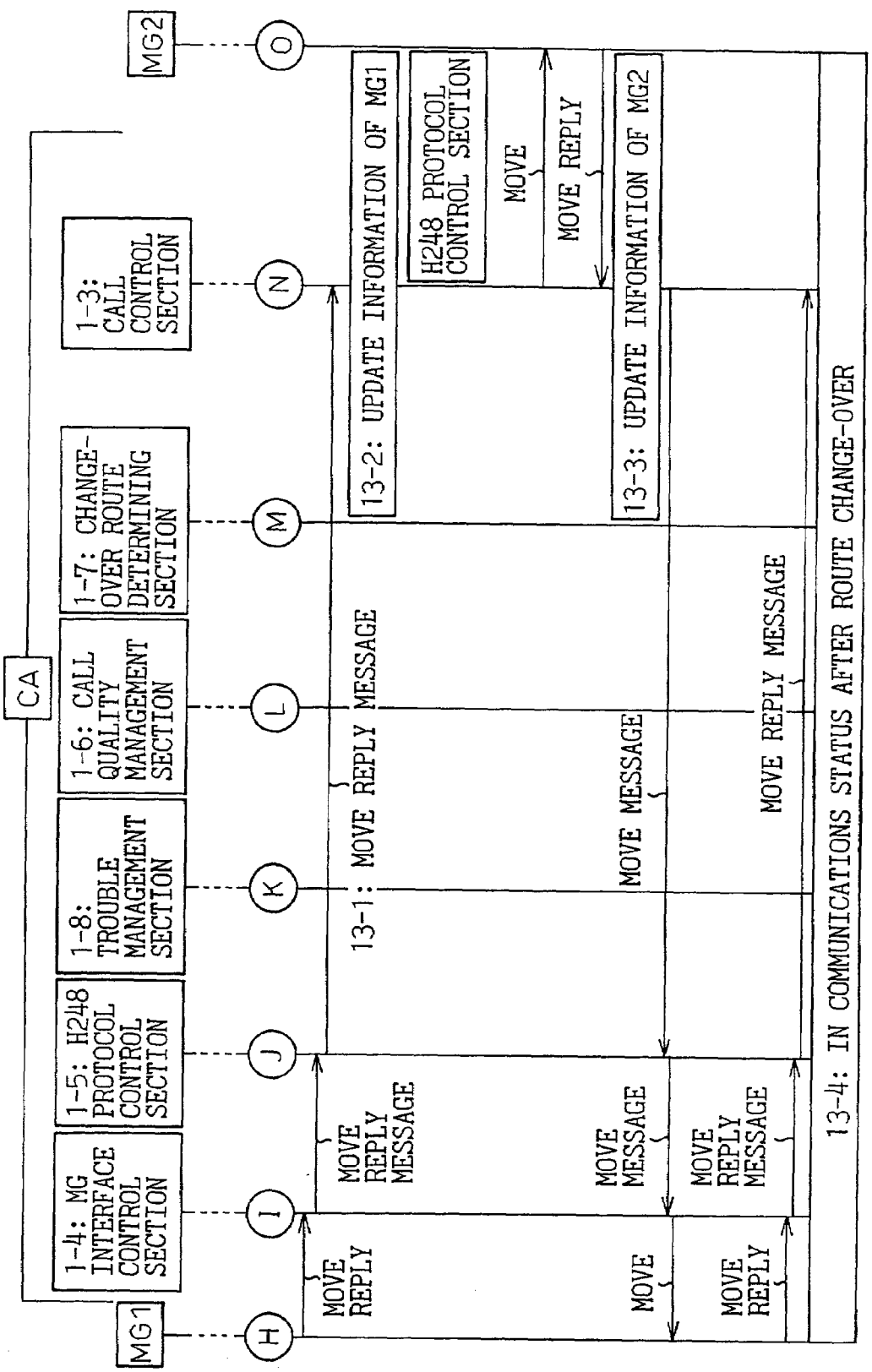
FIG. 13 is a route change-over sequence diagram using a trouble detection as a trigger according to the present invention.

Next, an example of executing a route change-over operation by using a trouble detection as a trigger will be explained with reference to sequence diagrams shown in FIGS. 12A and 12B and in FIG. 13. It is assumed that the media gateway apparatus MG1 and the media gateway apparatus MG2 are connected to each other via the route r1. It is assumed that a trouble has occurred in the media interface unit 2-10 directed to the route r1 within the media gateway apparatus MG1. The apparatus management section 2-5 detects this trouble, and transmits the route number of the route r1 in trouble to the call agent apparatus CA via the call quality management section 2-7 (12-1).

In the call agent apparatus CA, the trouble management section 1-8 that has received the route in trouble (the route r1) via the MG interface control section 1-4 posts the route in trouble (the route r1) to the call quality management section 1-6 (12-2). The call quality management section 1-6 that has received this posting posts the route in trouble (the route r1) to the change-over route determining section 1-7 to request for the change over of the route to a new route (12-3). The change-over route determining section 1-7 that has received this request refers to the route quality table (FIG. 9A), determines an optimum route (the route r2), and posts the information on this route r2 to the call quality management section 1-6 (12-4). The call quality management section 1-6 transmits the old route number (the route r1) and the new route number (the route r2) to the call control section 1-3, and transmits a request for changing over the route of all the calls, to the call control section 1-3 (12-5).

The call control section 1-3 that has received the request for changing over the route of all the calls searches the call information table for each route (FIG. 11B), and transmits a request for changing over the route of all the calls (CID (1), CID (2), CID (3), and CID (4)) that are using the route r1 as a move message, to the media gateway apparatus MG1 via the protocol control section 1-4 (12-6). The media gateway apparatus MG1 transmits a response to this route change-over request as a move reply message, to the call control section 1-3 of the call agent apparatus CA (13-1).

The call control section 1-3 of the call agent apparatus CA receives the response from the media gateway apparatus MG1, and updates the information of the media gateway apparatus MG1 (13-2). Similarly, the call control section 1-3 transmits a request for changing over the route, to the media gateway apparatus MG2, receives a response from the media gateway apparatus MG2, and updates the information of the media gateway apparatus MG2 (13-3). Thereafter, through a process similar to that of the sequences 6-6 and 6-7 shown in FIG. 6, the call control section 1-3 transmits collectively, for all the calls or for each call, an instruction for changing over the connection route of the calls (CID (1) to CID (4)) from the route r1 to the route r2, to the media gateway apparatuses MG1 and MG2. The media gateway apparatuses MG1 and MG2 change over the route connection from the route r1 to the route r2 according to the instruction (13-4).

As explained above, according to the present invention, in a sound/data integrated network that provides transmission services via an IP network connected by media gateway apparatuses MGs for which real-time transmission is required, a connection route of deteriorated quality is changed over to a connection route of good quality, based on statistical information on the transmission quality like fluctuation, a delay time, and a packet loss abandon rate in a dynamic using status of the IP network. With this arrangement, even when a burst traffic increase has occurred in the IP network during communications, it is possible to instantly change over the connection route to a connection route of good quality. As a result, it is possible to prevent degrading the quality of the services.

Further, the present invention is realized based on the modification and addition of new functions to only the media gateway apparatuses MGs and the call agent apparatus CA. Therefore, each carrier can provide services without the need for managing the policy of each IP network. As a result, it is possible to provide high-quality services at low cost.

Further, based on the maintenance of the service quality, a call originator does not require a call disconnection/reconnection operation. As a result, it is possible to lower the loss probability in the exchange service. Further, as the route for a plurality of calls is changed over at the same time according to the quality deterioration level, it is possible to prevent the deterioration in service quality at an early stage. Further, based on a change-over of a connection route in trouble for all calls to a connection route of good quality in a similar manner, it is possible to maintain the quality level of the calls that have been involved in the trouble.

What is claimed is:

1. A method of controlling change-over of a connection route between media gateway apparatuses, based on a sound/data integrated network that connects subscriber lines accommodated in a telephone network to an Internet protocol communication network via media gateway apparatuses, and that connects a media gateway apparatus at a call originating subscriber's line side to a media gateway apparatus at a call terminating subscriber's line side via the Internet protocol communication network, the change-over control method comprising:

a step at which the media gateway apparatuses collect/edit real-time packet quality information of Internet protocol packets for each call, and transmit the packet quality information for each call to a call agent apparatus;

a step at which the call agent apparatus receives packet quality information for each call transmitted from the media gateway apparatuses, updates packet quality information for each connection route based on the received packet quality information, and decides on a quality level of the call;

a step at which the call agent apparatus selects a connection route of good quality based on the packet quality information for each route when a decision has been made that the quality level has been deteriorated, and transmits an instruction for changing over the call connection route of the deteriorated quality level to the connection route of good quality, to the media gateway apparatuses; and a step at which the media gateway apparatuses change over the connection route according to the route change-over instruction received from the call agent apparatus, while maintaining a call connection set up between the call originating subscriber and the call terminating subscriber.

2. The method of controlling change-over of a connection route between media gateway apparatuses according to claim 1, wherein at the time of selecting a connection route of good quality based on the packet quality information for each rout, the connection route of good quality is selected based on the packet quality information that have been collected and edited by both media gateway apparatuses at the call originating subscriber's line side and the call terminating subscriber's line side.

3. The method of controlling change-over of a connection route between media gateway apparatuses according to claim 1, wherein at the step of deciding the quality level of a call, a decision is made about whether or not a connection route of a plurality of other calls that have been connected to the same connection route is to be changed over to a connection route of good quality, according to quality deterioration levels of the calls, and based on a result of a decision made, an instruction for changing over the route to a connection route of good quality is transmitted to the media gateway apparatuses.

4. The method of controlling change-over of a connection route between media gateway apparatuses according to claim 1, wherein the call agent apparatus receives information on a connection route in which a trouble has occurred from the media gateway apparatuses, selects a connection route having good quality for all the calls that are using the connection route in trouble, based on the packet quality information for each route, and transmits an instruction for changing over the connection route in trouble for all the calls to the connection route of good quality, to the media gateway apparatuses.

5. A media gateway apparatus that connects a subscriber's line accommodated in a telephone network to an Internet protocol communication network, and connects an originating/terminating call of the subscriber's line through a connection route via the Internet protocol communication network according to an instruction from a call agent, the media gateway apparatus comprising:

means for collecting/editing real-time packet quality information of Internet protocol packets for each call, and transmitting the packet quality information for each call to a call agent apparatus; and means for changing over the connection route, when decided to be of a deteriorated quality, of the Internet protocol communication network to another connection route of good quality in another Internet protocol communication network, while maintaining a call connection set up between a call originating subscriber and a call terminating subscriber, said another connection route of good quality being selected based on packet quality information for each route updated according to the transmitted packet quality information for each call.

6. A call agent apparatus that transmits an instruction for connecting originating/terminating calls of subscriber's lines through a connection route via an Internet protocol communication network, to media gateway apparatuses that connect the subscriber's lines accommodated in a telephone network to the Internet protocol communication network, the call agent apparatus comprising:

call quality managing means for receiving real-time packet quality information for each call transmitted from the media gateway apparatuses that have collected/edited the packet quality information, updating packet quality information for each connection route based on the received packet quality information, and deciding on a quality level of the call; change-over route determining means for selecting a connection route of good quality based on the packet quality information for each route when a decision has been made that the quality level has been deteriorated; and call control means for transmitting an instruction for changing over the call connection route of the deteriorated quality level to the connection route of good quality, to the media gateway apparatuses, while maintaining a call connection set up between a call originating subscriber and a call terminating subscriber.

7. The call agent apparatus according to claim 6, wherein the call quality managing means has means for receiving packet quality information that have been collected/edited by both media gateway apparatuses at the call originating subscriber's line side and the call terminating subscriber's line side, and updating packet quality information for each connection route in both media gateway apparatuses at the call originating/terminating sides, and the change-over route determining means has means for selecting a connection route of good quality based on the packet quality information for each route in both media gateway apparatuses at the call originating/terminating sides.

8. The call agent apparatus according to claim 6, wherein the call quality managing means has means for making a decision about whether or not a connection route of a plurality of other calls that have been connected to the same connection route is to be changed over to a connection route of good quality, according to quality deterioration levels of the calls, and the call control means has means for transmitting an instruction for changing over the connection route of a deteriorated quality level for the plurality of other calls to a connection route of a good quality level, to the media gateway apparatuses, according to a result of the decision.

9. The call agent apparatus according to claim 6, wherein the call agent apparatus has means for receiving, from the media gateway apparatuses, information on a connection route in which a trouble has occurred, and posting the information, on the connection route in trouble, to the call quality managing means, and the call quality managing means has means for transmitting to the change-over route determining means a request for changing over the connection route in trouble for all the calls to other connection route, whereby the call control means transmits to the media gateway apparatuses an instruction for changing over the connection route in trouble, for all the calls, to the connection route of good quality determined by the change-over route determining means.

* * * * *